US 8,444,461 B2

(12) United States Patent
Daley et al.

(10) Patent No.: US 8,444,461 B2
(45) Date of Patent: May 21, 2013

(54) SYSTEMS AND METHODS FOR THE DETECTION OF ANATOMICAL STRUCTURES AND POSITIONS THEREOF

(75) Inventors: Wayne Daley, Snellville, GA (US); Sergio Antonio Grullon, Marietta, GA (US); John Mills Stewart, Sandy Springs, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 750 days.

(21) Appl. No.: 12/608,939

(22) Filed: Oct. 29, 2009

(65) Prior Publication Data

US 2010/0105306 A1     Apr. 29, 2010

Related U.S. Application Data

(60) Provisional application No. 61/109,315, filed on Oct. 29, 2008.

(51) Int. Cl.
*A22C 17/00* (2006.01)

(52) U.S. Cl.
USPC ......................................................... 452/135

(58) Field of Classification Search
None
See application file for complete search history.

(56) References Cited

U.S. PATENT DOCUMENTS

| 5,133,687 A * | 7/1992 | Malloy .......................... 452/149 |
| 5,205,779 A * | 4/1993 | O'Brien et al. ................ 452/157 |
| 5,334,084 A * | 8/1994 | O'Brien et al. ................ 452/157 |
| 5,944,598 A * | 8/1999 | Tong et al. ..................... 452/158 |
| RE36,664 E * | 4/2000 | O'Brien et al. ................ 452/157 |
| 6,059,648 A | 5/2000 | Kodama et al. |
| 6,277,020 B1 | 8/2001 | Stephens |
| 6,891,961 B2 | 5/2005 | Eger et al. |
| 6,912,434 B2 * | 6/2005 | van den Nieuwelaar et al. ............................. 700/116 |
| 7,052,388 B2 | 5/2006 | Houtz |
| 7,153,203 B2 | 12/2006 | Pfarr et al. |
| 2004/0034340 A1 | 2/2004 | Biscup |
| 2007/0202229 A1 | 8/2007 | Nielsen |

FOREIGN PATENT DOCUMENTS

| WO | 9104670 A1 | 4/1991 |
| WO | 2008096460 A1 | 8/2008 |

* cited by examiner

*Primary Examiner* — Richard Price, Jr.
(74) *Attorney, Agent, or Firm* — Troy S. Kleckley; Troutman Sanders LLP

(57) ABSTRACT

The various embodiments of the present disclosure relate generally to systems and methods for the detection of anatomical structures and anatomical positions. More particularly, the various embodiments of the present disclosure are directed to the detection of musculoskeletal elements, such as bones, tendons, ligaments, cartilage, and the like, which could be useful for example in poultry processing for bone screening as well as for guidance of machines for processing. For example, a system for detecting a bone in a carcass comprises: a device for supporting a carcass comprising a base and a frame attached to the base, wherein the frame is configured to contact at least a portion of a cavity of a carcass; and an electromagnetic radiation source, wherein the electromagnetic radiation source is configured to irradiate at least a portion of a cavity of a carcass.

22 Claims, 11 Drawing Sheets

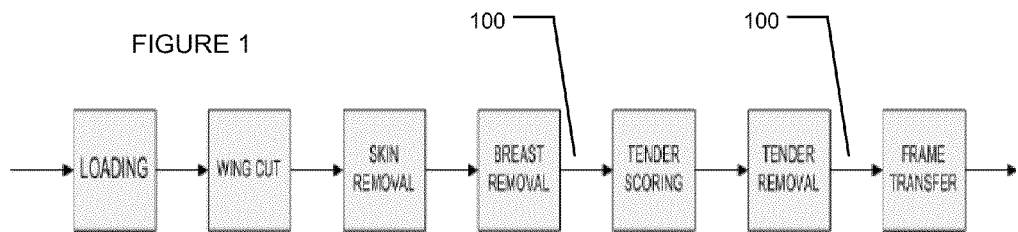
FIGURE 1
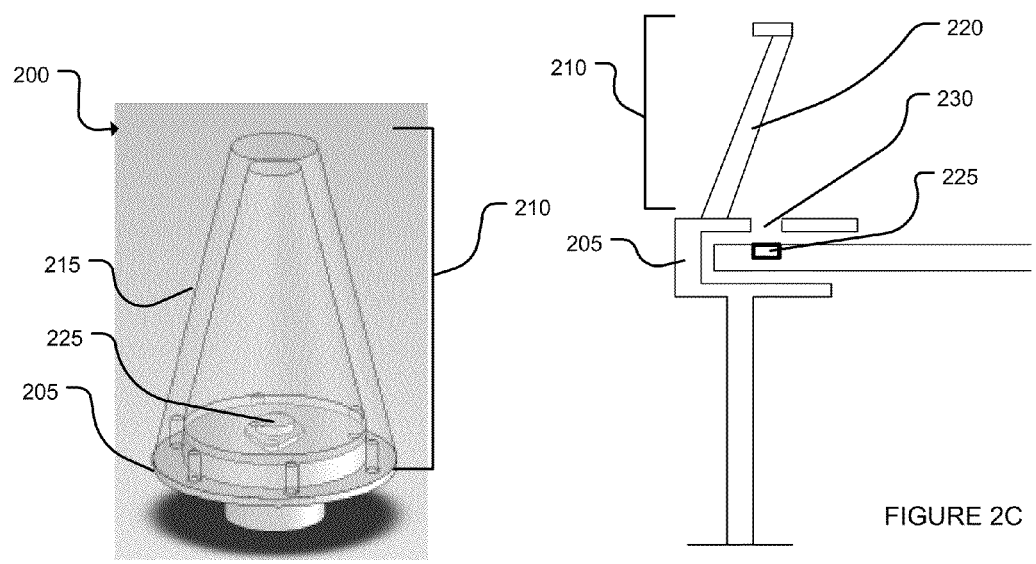
FIGURE 2A
FIGURE 2C
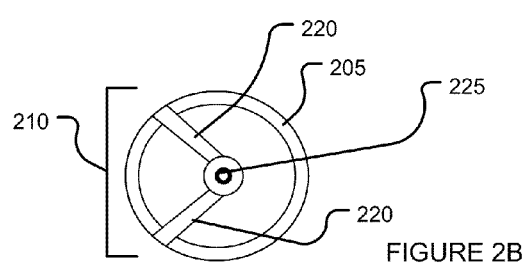
FIGURE 2B
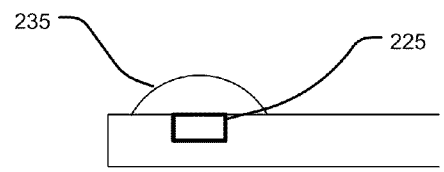
FIGURE 2D

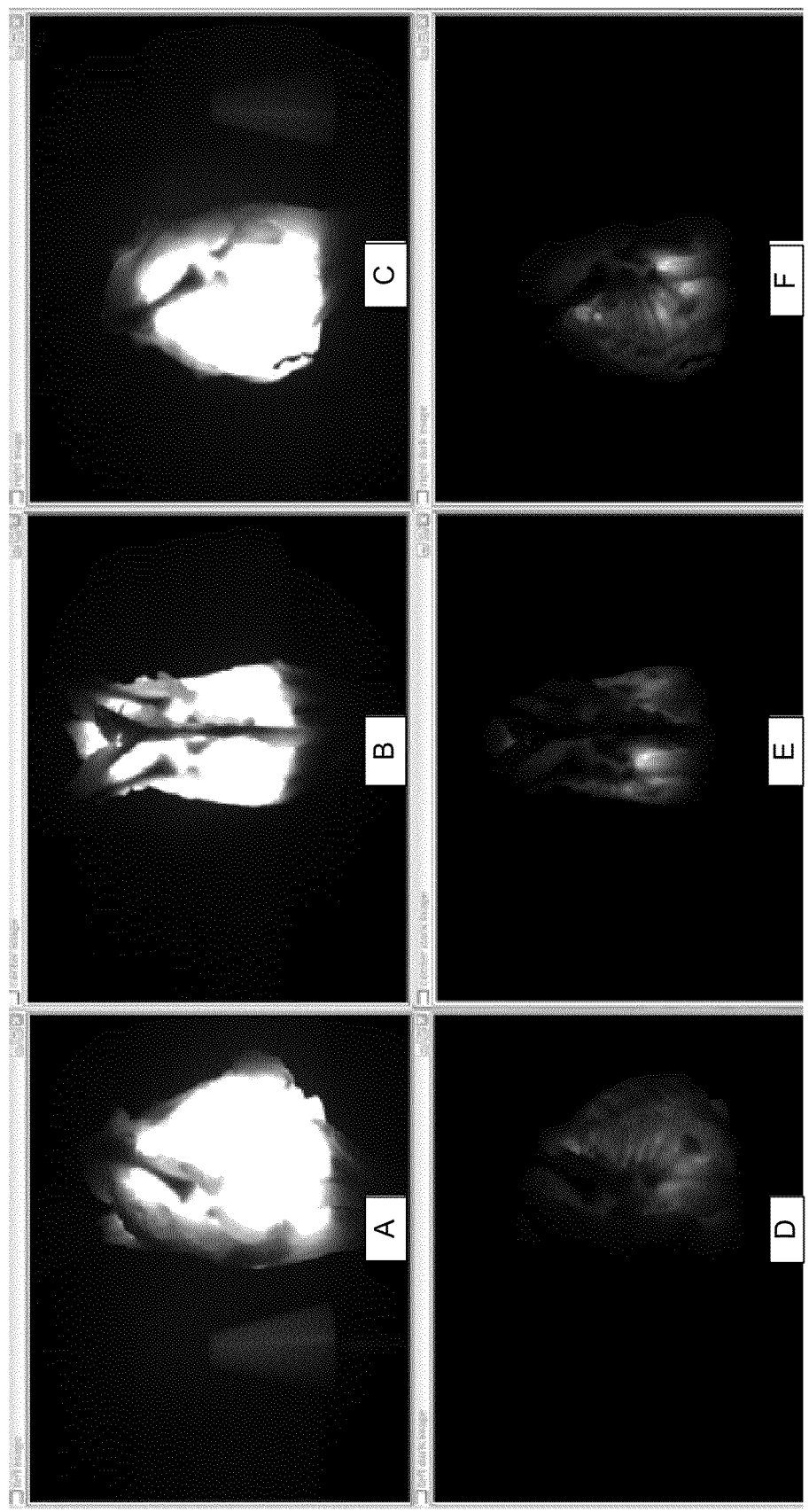
FIGURES 7A-F

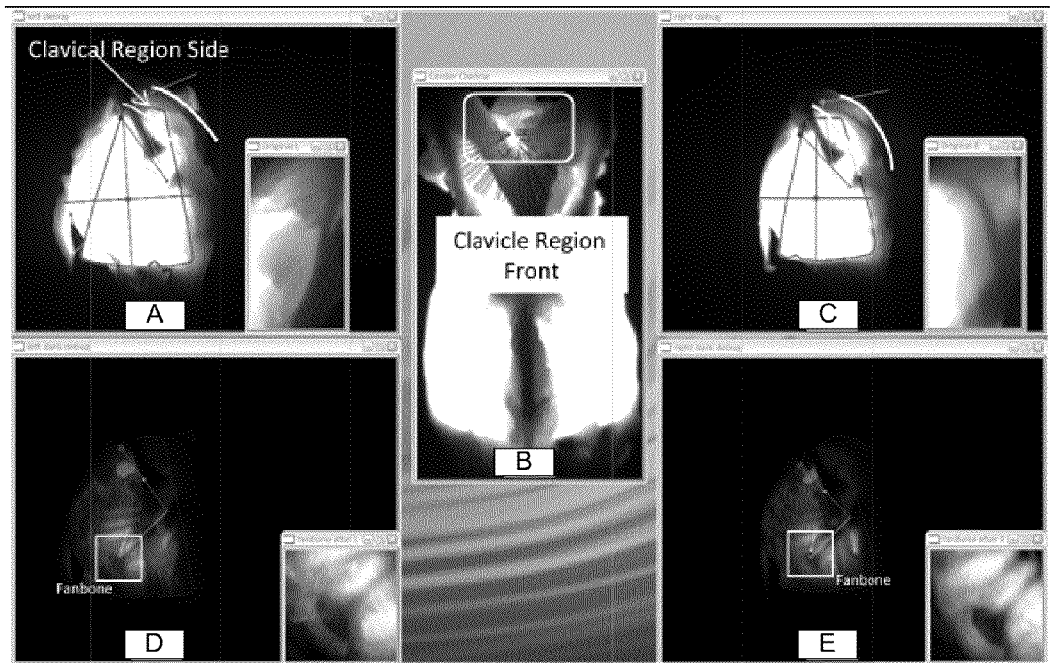
FIGURES 8A-E
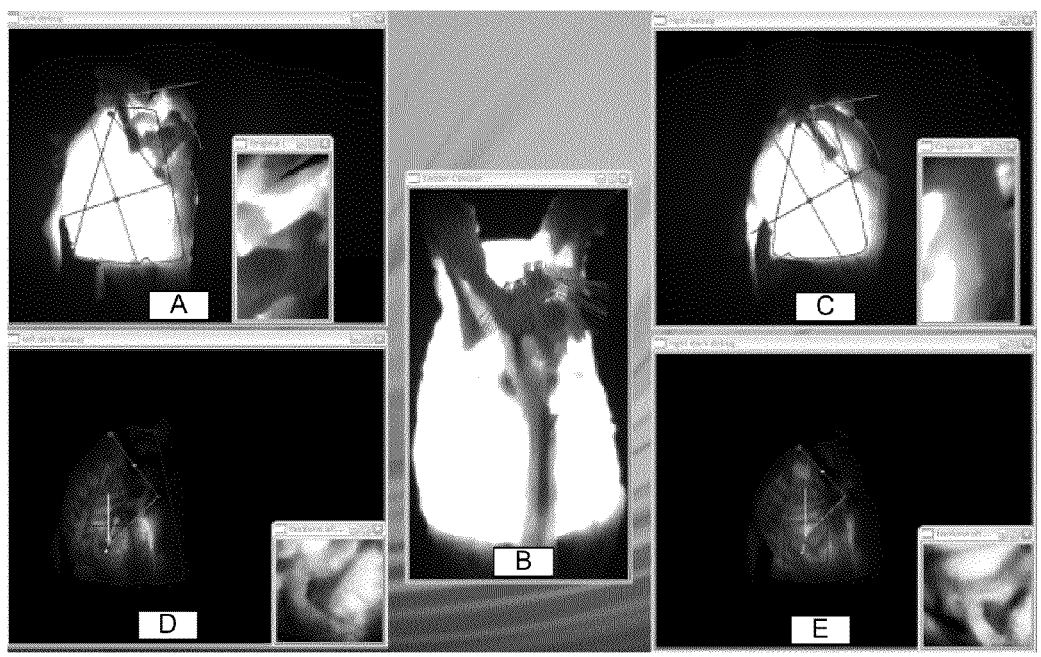
FIGURES 9A-E

SYSTEMS AND METHODS FOR THE DETECTION OF ANATOMICAL STRUCTURES AND POSITIONS THEREOF

RELATED APPLICATION

This application claims, under 35 U.S.C. §119(e), the benefit of U.S. Provisional Application Ser. No. 61/109,315, filed 29 Oct. 2008, the entire contents and substance of which are hereby incorporated by reference as if fully set forth below.

TECHNICAL FIELD OF THE INVENTION

The various embodiments of the present disclosure relate generally to systems and methods for the detection of anatomical structures and anatomical positions. More particularly, the various embodiments of the present disclosure are directed to the detection of musculoskeletal elements, such as bones, tendons, ligaments, cartilage, and the like, which could be useful for example in poultry processing for bone screening as well as for guidance of machines for processing.

BACKGROUND OF THE INVENTION

The presence of foreign materials in food products is a significant concern to food processors. Naturally occurring foreign materials, however, pose a special challenge. An example of a naturally occurring foreign material is bone, which can typically occur in the product because of processing techniques or product variation. The concern over the presence of bone in a processed food product is most evident in the poultry industry, as the industry has steadily moved towards further processed or value added products (i.e., deboned poultry products).

The occurrence of bone in poultry fillets is undesirable in many respects. First, there is concern regarding the potential liability of producers if consumers swallow bones that could prove to be harmful. Second, there is a concern for customer satisfaction. In general, poultry sellers receive two complaints for every million pounds of product, which results in approximately 230 complaints for the year. As a result, the customers of most poultry suppliers of deboned product are now placing additional pressures on suppliers to reduce the incidence of bones.

Poultry suppliers have attempted to address the incidence of bones by implementing both manual and automated deboning processes. Research has shown that both manual and automated deboning processes are not perfect, and bones occur in the product using either the manual or automated process at rates that could be of concern. For example, Smith inspected 300,299 pounds of fillets, of which 379 bones were found. (1) Similarly, in inspecting 186,310 pounds of tenders, 428 bones were found. The predominant bone found in these tests was the clavicle; however, there were also no discernable differences between the amount of bones found when the deboning processes are compared (manual to automated).

From a quality control perspective, the ability to detect these bones would also improve production efficiencies by helping to reduce the possibility of rework while optimizing yield. Currently, two inspection techniques for monitoring bone in food products are in use: manual palpitation and X-ray screening. Besides being both time-consuming and expensive processes, manual palpitation and X-ray screening techniques have additional shortcomings Manual palpitation techniques are labor-intensive and repetitive. It is well known that whenever humans perform any repetitive job such as this, they eventually lose their concentration and become less effective at conducting the task over time, which leads to errors. In addition, manual palpitation techniques pose the risk of microbial contamination. X-ray screening techniques have also been problematic. Natural variations in thickness in food products combined with changes in meat product properties (meat/bone calcification) over time, can lead to errors in the detection. In addition, X-ray images are typically low contrast, and it is challenging to construct algorithms that can accommodate the natural variations in a global sense. Furthermore, X-ray screening systems provide additional issues related to product presentation for X-ray interrogation, as well as concerns over the life of the X-ray tube and sensor.

Perhaps the greatest limitation in the manual palpitation and X-ray screening techniques is that neither of these techniques allows for the ability to perform real time quality and process control as there is no mechanism to provide feedback to the deboning process in a timely way. Accordingly, there is a need for a screening approach as part of the deboning process that would be capable of reducing the occurrence of bones as well as provide real time quality and process control. It is to the provision of such a screening approach that the various embodiments of the present invention are directed. In a similar vein, the ability to guide machinery to accommodate for the variability of natural anatomy requires the identification of relevant anatomical structures, such as tendons and joints.

BRIEF SUMMARY OF THE INVENTION

The various embodiments of the present invention are directed to apparatus, systems, and methods for the detection of anatomical structures and anatomical positions. More particularly, the various embodiments of the present disclosure are directed to the detection of musculoskeletal elements, such as bones, tendons, ligaments, cartilage, and the like, which could be useful for example in poultry processing for bone screening as well as for guidance of machines for processing.

An aspect of the present invention comprises a device for supporting a carcass comprising: a base; a frame attached to the base, wherein the frame is configured to contact at least a portion of a cavity of a carcass; and an electromagnetic radiation source, wherein the electromagnetic radiation source is configured to irradiate at least a portion of a cavity of a carcass. In one embodiment, the frame comprises one or more projections projecting from the base, wherein one or more projections are configured to contact at least a portion of a cavity of a carcass. In another embodiment, the frame comprises a substantially continuous support surface, wherein the support surface is configured to contact at least a portion of a cavity of a carcass. In some embodiments of a device for supporting a carcass, the electromagnetic radiation source (e.g., one or more light emitting diodes) is attached to the base. In an other embodiment, the base can define a hole and the electromagnetic radiation source is configured to project electromagnetic radiation through the hole so as to irradiate at least a portion of a cavity of a carcass.

An another aspect of the present invention comprises a system for detecting a bone in a carcass comprising: a device for supporting a carcass comprising a base and a frame, the frame attached to the base, wherein the frame is configured to contact at least a portion of a cavity of a carcass; a signal source, wherein the signal source is configured to interrogate at least a portion of a cavity of a carcass; one or more detectors, wherein the detector is capable of detecting at least a portion of the signal transmitted through the carcass; and an image processing subsystem in communication with the one or more detectors, wherein the image processing subsystem processes data collected by the detector to produce an image of at least one bone attached to the carcass.

In such a system, the frame can comprise one or more projections projecting from the base, wherein one or more projections are configured to contact at least a portion of a cavity of a carcass. Alternatively, the frame can comprise a substantially continuous support surface, wherein the support surface is configured to contact at least a portion of a cavity of a carcass. In one embodiment, the signal source is attached to the base, and this signal source can be an electromagnetic radiation source that is configured to irradiate at least a portion of a cavity of a carcass. In another embodiment, the base can define a hole, and the signal source is configured to project a signal through the hole so as to interrogate at least a portion of a cavity of a carcass. In such an embodiment, the signal source can be an electromagnetic radiations source.

In one embodiment, the one or more detectors can comprise a first camera, a second camera, and a third camera, wherein the first camera provides a center view of the carcass, the second camera provided a right view of the carcass, and the third camera provides a left view of the carcass. In addition, the system can further comprise a user interface, wherein the user interface provides real time feedback to a user regarding at least one bone of the carcass, such as a clavicle, a fan bone, or a coracoid.

Yet another aspect of the present invention comprises a method for detecting an anatomical structure in a carcass comprising: detecting a presence or an absence of an anatomical structure in a carcass; and providing information to a user regarding a process in real time, wherein the information can be used by the user to modify the process. For example, in this method, the anatomical structure can be a bone and the process can be a deboning process. In another example of this method, the anatomical structure can be a muscle and the process can be a deboning process.

The step of detecting a presence or an absence of an anatomical structure in a carcass can further comprise: providing a carcass, wherein the carcass is supported on a conical device comprising a base and a frame, the frame attached to the base, wherein the frame is configured to contact at least a portion of a cavity of a carcass; irradiating at least a portion of a cavity of a carcass with a first power level of electromagnetic radiation; detecting with a first detector at least a portion of the first power level of electromagnetic radiation transmitted through the carcass; and producing an image of at least one bone on the carcass, wherein data for the image is collected from the detector.

A method for detecting an anatomical structure can further comprise: irradiating at least a portion of a cavity of a carcass with a second power level of electromagnetic radiation; detecting with a second detector at least a portion of the second power level of electromagnetic radiation transmitted through the carcass; and producing an image of at least one bone (e.g., a clavicle, a fan bone, or a coracoid) on the carcass, wherein data for the image is collected from the detector.

Another aspect of the present invention comprises a method for determining the location of a second anatomical point, comprising: collecting data on at least one first anatomical point; communicating the data to a processor; processing the data utilizing an anatomical library comprising internal and external anatomical points; and deriving a second anatomical point. According to one embodiment of this method, the first anatomical point can be an external anatomical point and the second anatomical point can be an internal anatomical point. In another embodiment, the first anatomical point can be an internal anatomical point and the second anatomical point can be an external anatomical point. In yet another embodiment, the first anatomical point can be an external anatomical point and the second anatomical point can be an external anatomical point. In still another embodiment, the first anatomical point can be an internal anatomical point and the second anatomical point can be an internal anatomical point.

In one embodiment, the method for determining the location of a second anatomical point can further comprise outputting a response to a user interface, wherein the second anatomical point comprises a bone, and wherein the response comprises indicating a presence of a bone or an absence of a bone. In another embodiment, the method can further comprise calculating a cutting trajectory, wherein the deriving a second anatomical point comprises deriving a plurality of second anatomical points.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF DRAWINGS

FIG. 1 is a diagram illustrating the operation in the deboning process.

FIGS. 2A-D illustrates exemplary embodiments of a device for supporting a carcass.

FIGS. 7A-F show images acquired using a system for detecting a bone in a carcass under high power (A-C) and low power (D-F).

FIGS. 8A-E provide images of a carcass with a clavicle bone after processing.

FIGS. 9A-E provide images of a carcass without a clavicle bone after processing.

DETAILED DESCRIPTION OF THE INVENTION

Figure 3:
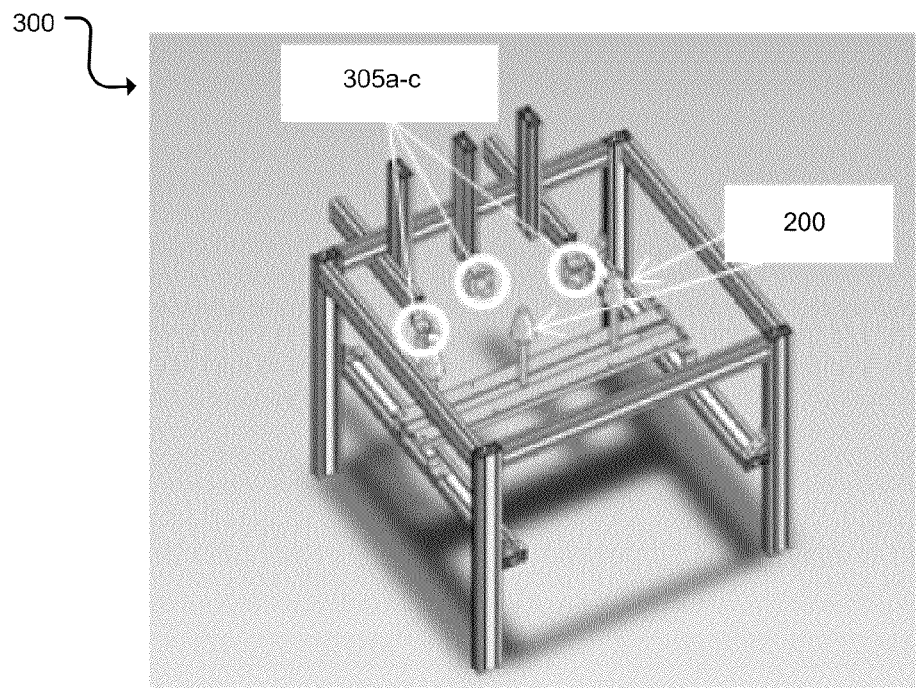
FIG. 3 is a schematic of a system for detecting a bone in a carcass.

Bone detection is currently a problem of significant interest to the poultry processing industry. There are two processes currently used by industry for the production of deboned meat: a manual process and automated process. A block diagram listing the required sequence of operations is shown in FIG. 1. Both the manual and automated processes in effect implement the same sequence of operations, and both have problems with bones due mostly to the fact that the product being processed (called a front half) is a non-uniform product. As shown in FIG. 1, deboning is a sequence of disassembly events that begins with a wing cut followed by other cutting and pulling operations that ultimately result in a deboned meat product and what is termed a "frame" or "cage." Two bones that are most likely to end up in the finished product are the clavicle and fan bone (i.e., thoracic process) because they can be torn away during the pulling of the breast meat. Previous work has shown that there are problems with bones in both types of operations. Although commercially available automated deboning systems exist, many poultry processors have reverted to manual deboning lines as it is believed that people, as opposed to machines, can be more responsive to the natural variability of the product population.

With the majority of poultry products being further processed, the detection of bones usually requires inspection of the deboned product. Current inspection approaches rely on either X-rays or manual palpitation; however, both of these approaches are expensive, time consuming processes that do not result in sufficient detection of bone in deboned poultry products. Further, these approaches do not allow for the performance of real time quality and process control that provides feedback to the deboning process.

Referring now to the figures, wherein like reference numerals represent like parts throughout the several views, exemplary embodiments of the present invention will be described in detail. Throughout this description, various components can be identified as having specific values or parameters, however, these items are provided as exemplary embodiments. Indeed, the exemplary embodiments do not limit the various aspects and concepts of the present invention as many comparable parameters, sizes, ranges, and/or values can be implemented. The terms "first," "second," and the like, "primary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

The various embodiments of the present invention comprise systems and methods for the inspection of a processed carcass during the deboning process or upon completion of the deboning process 100, as indicated by in FIG. 1. In the poultry industry, a poultry carcass is processed along a "cone line." A cone line is named as such because a poultry carcass is transported along a processing line on cone shaped carrier that is made out of plastic or stainless steel. A cone line could be considered a disassembly line with different operations being conducted at the various stages of the process (See, FIG. 1). Examination of the carcass during or upon completion of the deboning process permits examination of the bones while they are still associated with the carcass, which permits interrogation of particular regions of interest as opposed to examination of the entire carcass or within the processed meat product. Further, such an approach provides feedback in real time, allowing for modification of the deboning process as needed.

An aspect of the present invention comprises a system for detecting a bone in a carcass comprising: a device for supporting a carcass comprising a base and a frame attached to the base, wherein the frame is configured to contact at least a portion of a cavity of a carcass; an electromagnetic radiation source, wherein the electromagnetic radiation source is configured to irradiate at least a portion of a cavity of a carcass; one or more detectors, wherein the detector is capable of detecting electromagnetic radiation transmitted through the carcass; and an image processing subsystem in communication with the one or more detectors, wherein the image processing subsystems processes data collected by the detector to produce an image of at least one bone attached to the carcass.

As used herein, the term "carcass" refers to the body of many animals slaughtered for food, including, but not limited to, bovine, avian, porcine, ovis, venison, fish, and lagomorphs, among others. Further, as used herein, the term "carcass" may be used to refer to an animal body before, during, or after a processing event.

The system utilizes a device for supporting a carcass. Various exemplary embodiments of a device for supporting a carcass are shown in FIGS. 2A-D. A device for supporting a carcass 200 can comprise a base 205 and a frame 210. The frame 210 is attached the base 205, and the frame is configured to contact at least a portion of a carcass. Given the natural variability in the shapes and sizes of carcasses as well as the various techniques for processing various animals for food, the device for supporting a carcass 200 can have many shapes and sizes suitable for the carcass of the interest. The device for supporting a carcass 200 may be adapted to externally support a carcass, by contacting at least a portion of the outer surface of a carcass. In another embodiment, the device for supporting a carcass 200 may be adapted to internally support a carcass, by contacting at least a portion of a cavity of the carcass. In yet another embodiment, the device for supporting a carcass 200 may be adapted to both externally and internally support a carcass. In an exemplary embodiment, a device for supporting a carcass 200 is configured to internally support a poultry carcass (FIGS. 2A-C).

In an exemplary embodiment of a device for supporting a carcass 200, the frame 210 can comprise a substantially continuous support surface 215, wherein the support surface 215 is configured to contact at least a portion of a cavity of a carcass. (FIG. 2A). The substantially continuous support surface 215 can have various sizes and shapes to support various carcasses. For example, the substantially continuous support surface 215 can have a cone-shape to support a poultry carcass (FIG. 2A).

In another exemplary embodiment, the frame 210 can comprise one or more projections 220 projecting from the base 205, to form a substantially discontinuous support structure. In such an embodiment, one or more projections 220 are configured to contact at least a portion of a cavity of a carcass and thereby support the carcass. FIG. 2B provides a top view and FIG. 2C provides a side view of such an embodiment. The one or more projections 220 can have various sizes and shapes to support various carcasses. For example, the one or more projections 220 can have a general cone-shape to support a poultry carcass. Although the one or more projections 220 can be configured to contact at least a portion of a cavity of a carcass, some embodiments of the present invention can comprise projections capable of attaching to or penetrating the carcass.

The device for supporting a carcass 200 can be made of many materials. The base 205 and frame 210 can be made of the same materials or different materials. Preferably, the device for supporting a carcass 200 is of a food-safe material, such as metals and polymers, including but not limited to titanium, stainless steel, polyethylene terephthalate, high density polyethylene (HDPE), polyvinyl chloride, polypropylene, and polystyrene.

A device for supporting a carcass 200 can comprise an electromagnetic radiation source, wherein the electromagnetic radiation source is configured to irradiate at least a portion of a cavity of a carcass. As used herein, the term "electromagnetic radiation" is intended to include many forms of electromagnetic radiation including, but not limited to, radio waves, microwaves, infrared radiation, visible light, ultraviolet radiation, X-rays, and gamma rays. In an exemplary embodiment of the present invention, the electromagnetic radiation is infrared radiation (IR). Although a device for supporting a carcass 200 can comprise an electromagnetic radiation source, a device for supporting a carcass 200 (and, accordingly, a system for detecting a bone in a carcass 300) can be adapted to use many signal generators—signal sensor combinations beyond those designed for electromagnetic radiation, such as ultrasound-based signal generators and sensors, among others.

In one embodiment of the present in invention, a device for supporting a carcass 200 has an electromagnetic radiation source 225 is attached to the device. As shown in FIG. 2A, an electromagnetic radiation source 225 can be attached to a device for supporting a carcass 200 at the base 205. In an exemplary embodiment, the electromagnetic radiation source 225 is a light-emitting diode (LED) attached to the base 205. In another exemplary embodiment, the electromagnetic radiation source 225 is a plurality of light-emitting diodes (LED) attached to the base 205. As used herein, the term "plurality" refers to more than one. Thus, according to this embodiment, the electromagnetic radiation source 225 (or other signal generator) is coupled to the device for supporting a carcass 200. In yet another exemplary embodiment, the electromagnetic radiation source 225 is Xenon strobe.

In another embodiment, the base 205 of the device for supporting a carcass 200 defines a hole 230 and the electromagnetic radiation source 225 is configured to project electromagnetic radiation through the hole 230 so as to irradiate at least a portion of a cavity of a carcass. In such an embodiment, it is contemplated that the electromagnetic radiation source 225 is stationary (i.e., not physically coupled to the device for supporting a carcass 200). According to this embodiment, the devices for supporting a carcass 200 would travel along the processing line and at some point during processing would travel over the stationary electromagnetic radiation 225 source, so as to irradiate at least a portion of a cavity of a carcass. (FIG. 2C). The electromagnetic radiation source 225 that is stationary can comprise one or more LEDs. In an exemplary embodiment of LED-based electromagnetic radiation sources, the LED can be modified with a lens or diffuser 235. In yet another exemplary embodiment, the electromagnetic radiation source 225 is Xenon strobe.

The shape and composition of the device for supporting a carcass 200 may vary based upon the electromagnetic radiation source 225. For example, if the electromagnetic radiation source is IR, a frame 210 having a substantially continuous support surface 215, would likely be made of a substantially transparent material, such as HDPE; however, if the frame 210 comprises one or more projections 220 to form a substantially discontinuous support structure, a non-transparent material, such as stainless steel, can be used because the substantially discontinuous support structure would allow for the transmission of light from the electromagnetic radiation source 225 to at least a portion of a cavity of a carcass. One of ordinary skill in the art could readily adapt the shape and composition of the device for supporting a carcass 200 based upon the type of electromagnetic radiation used to interrogate the carcass.

Figure 4:
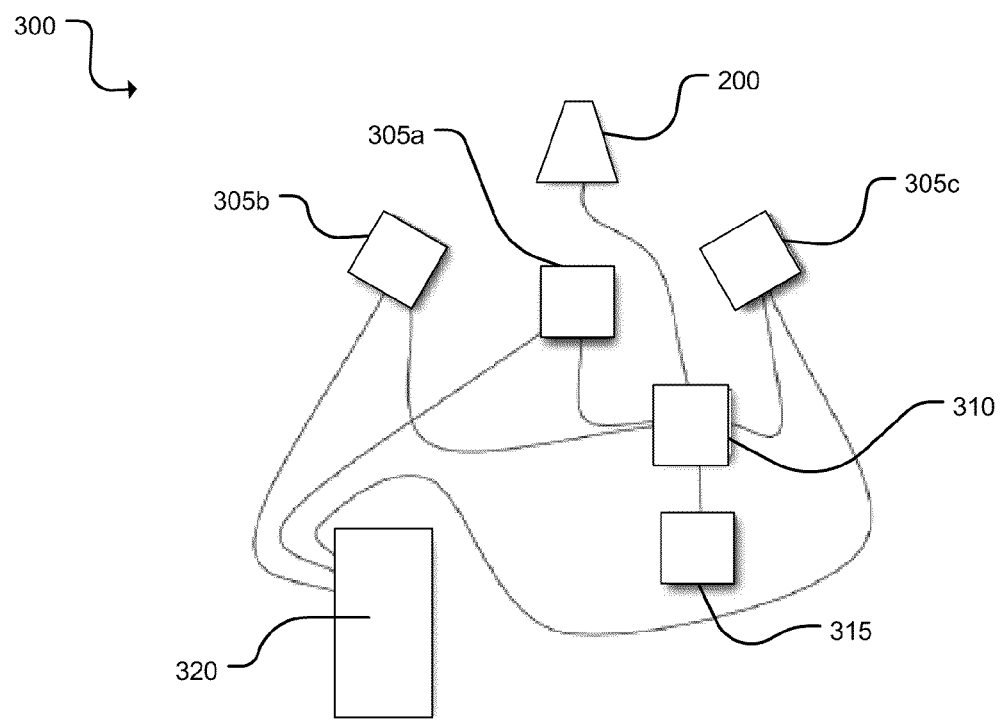
FIG. 4 is a schematic demonstrating the interconnection of components of a system for detecting a bone in a carcass.

Similar to the design choice in the shape and composition of the device for supporting a carcass 200, the type of detector 305 used can vary depending upon the choice of electromagnetic radiation. The detector can comprise many devices sensitive to electromagnetic radiation, including, but not limited to, a camera, a CCD sensor, a CMOS sensor, an X-ray sensor, or other signal sensors (e.g., ultrasonics). For example, in an exemplary embodiment where IR radiation is the type electromagnetic radiation used, the detector can comprise a camera. In an embodiment of this system, the detector can comprise one or more cameras. In an exemplary embodiment, the system for detecting a bone in a carcass 300 can comprise three cameras 305, a first camera 305a, a second camera 305b, and a third camera 305c, as shown in FIG. 3. In one embodiment of the present invention, the first camera 305a provides a center view of the carcass, the second camera 305b provided a right view of the carcass, and the third camera 305c provides a left view of the carcass. Of course, the systems can use one or more types of signal generator/sensor combinations FIG. 4 is a block diagram illustrating the interconnection of components of a system for detecting a bone in a carcass 300. The detectors 305a-c are in electrical communication with a strobe circuit 310, which is in electrical communication with a power source 315. According to this embodiment, the device for supporting a carcass 200 is also in electrical communication with the strobe circuit 310. By operating the system in strobe mode, the device for supporting a carcass 200 and the detectors 305a-c can be powered substantially simultaneously, which allows for the substantially simultaneous capture of images from the three detectors 305a-c. The detectors 305a-c are also in communication with an image processing subsystem 320. The image processing subsystem 320 processes data collected by the detectors 305a-c to produce an image of at least one bone attached to the carcass. In the case of poultry, the bone can be a clavicle, a fan bone, or a coracoid, among others.

The system for detecting a bone in a carcass 300 can further comprise a user interface, wherein the user interface provides real time feedback to a user regarding at least one bone attached to the carcass. The user interface (FIG. 5) can provide information regarding whether the deboning process has removed certain bones from the carcass (e.g., the clavicle or the fan bone). In addition, the user interface can also provide information regarding whether excess meat is retained on the carcass.

Another aspect of the present invention comprises a method for detecting a bone in a carcass comprising: providing a carcass, wherein the carcass is supported on a conical device comprising a base and a frame attached to the base, wherein the frame is configured to contact at least a portion of a cavity of a carcass; irradiating at least a portion of a cavity of a carcass with a first power level of electromagnetic radiation; detecting with a first detector at least a portion of the first power level of electromagnetic radiation transmitted through the carcass; and producing an image of at least one least one bone on the carcass, wherein data for the image is collected from the detector.

In order to provide real time information regarding the deboning process, a method for detecting a bone in a carcass 100 is performed on the processing line during the deboning of the carcass or upon completion of the deboning process. Generally, during the processing of poultry, poultry carcasses move along a cone line and are processed, as indicated in FIG. 1. The method for detecting a bone in a carcass 100 can be performed following the removal of the breast meat or after removal of the tenders (FIG. 1).

Following the removal of the breast meat or after removal of the tenders, a poultry carcass on the cone line is examined using the systems and methods described herein. Once the poultry carcass enters into the field of view of the center camera 305a, the device for supporting a carcass 200 is irradiated with a first power level of electromagnetic radiation and the detectors 305a-c substantially simultaneously capture an image of the carcass. Of course, the detection can occur simultaneously, sequentially or some variation therebetween. The first detector and the second detector can be the same, or they can be different. Similarly, the first power level and the second power level can be the same or different, in terms of both kind and magnitude.

Using the system configuration illustrated in FIG. 3, three backlit views of each carcass are obtained. Optionally, images are taken at more than one power level to provide various thresholds of detections based upon the composition of the bones of interest. For example, images can be taken at two power levels—a first high power level (about 31 V) to detect harder bones such as the clavicle and a second lower power level (about 14 V) to detect softer bones such as the fan bone. By focusing the examination to two distinct regions (i.e., the clavicle and fan bone regions), the areas for interrogation are reduced, and the time to process such images are coordinately reduced. Alternatively, the electromagnetic radiation source can provide two electromagnetic power levels to two specific areas at the same time. For example, a lens could be placed over an LED to provide a first power level to a first area and a second power level to a second area.

The systems and methods of the present invention could be described as a passive technique; however, these systems and methods could be readily modified to function as a dynamic technique, which would involve the manipulation of the frame prior to imaging and could possible improve the overall accuracy. Whenever there is a broken or missing bone on the carcass, the structural integrity of the carcass is compromised, and there can be significant motion in the region of the clavicle that can be detected with a visual flow analysis, for example.

The technique can be extended for machine control in guiding cutting operations. For example, an aspect of the present invention comprises a method for determining the location of one or more second anatomical points from one or more first anatomical points. A first anatomical point can be an internal anatomical point or an external anatomical point. Similarly, a second anatomical point can be an internal anatomical point or an external anatomical point. Thus, the methods of the present invention can be used to determine an internal anatomical point from an external anatomical point; to determine an external anatomical point from an internal anatomical point; to determine an external anatomical point from an external anatomical point; or to determine an internal anatomical point from an internal anatomical point. Given the ability to derive both internal and external anatomical points, the terms "internal" and "external" can be herein used interchangeably.

As used herein, the term "anatomical structure" can refer to many anatomical structures, including but not limited to, bone, muscle, tendon, ligaments, skin, organs, and tissues. As such, the term "anatomical point," as used herein, can refer to a point, a plurality of points, a contour, a line, a region, or some combination thereof, associated with an anatomical structure.

Although the apparatus, systems, and methods of the present disclosure are generally directed to the processing of carcasses, method for determining the location of one or more second anatomical points from one or more first anatomical points can be utilized not only on animals typically slaughtered for food, but may also be utilized on all animals, including humans.

This method involves collecting raw data regarding internal and external anatomical positions of a test subject or a plurality of test subjects. This data can be collected thorough a variety of ways, such as through X-rays, computer tomography (CT), magnetic resonance imaging (MRI), laser scanning (e.g., FARO), or the like. This raw data can then be processed by measuring various dimensions (e.g., the distance between the intersection between the breast and wing fronts to determine the cutting point for a shoulder joint ligament) or by observation followed by statistically calculating the mathematical relationships between three-dimensional locations, which can be determined by various approaches such as least square and splines, among others. The use of multiple dimensions improves the accuracy in locating points and paths of interest as opposed to current methods used in automated system (e.g., using weight to locate positions). Following calculation of these internal anatomical points, the anatomical structure can be interrogated by invasively testing the structure to verify accurate calculation of the internal anatomical point. Invasive testing can be performed by many ways known in the art, such as the use of a robot to obtain the calculated position, use of a syringe robot effector to penetrate musculoskeletal mass with minimal impact, or use of a tinted viscose liquid to mark point or path, among others. Upon verification of the three dimensional location of internal point(s) for the test subjects(s), an anatomical library is effectively created, which includes the mathematical, anatomical, and spatial relationships among and between internal and external anatomical points, and various combinations of internal and external points.

Using this anatomical library, these measurements can be used to derive the three dimensional location of an internal anatomical point or a series of internal anatomical points for an unknown carcass (i.e., an anatomically similar carcass as compared to the test subject(s)). This method involves collecting data on the external anatomical structures of a carcass to determine at least one external anatomical point. For example, various external anatomical points can be used, including, but not limited to, the keel tip and the intersection between the breast and the wing-fronts (See, FIG. 6C). In addition, various internal anatomical points can be used, including, but not limited to, points formed by the contour of the coracoid, the contour of the keel, and the contour of the clavicle. Of course, the more external/internal anatomical points that are examined, the greater the accuracy in predicting the location of an internal/external anatomical point. The collection of data can be performed by way of various tactile methods (e.g., sensory, use of a mechanical device), non-tactile methods (e.g., a camera), or combinations thereof.

This data is then communicated to a processor, which processes the data. The processor performs various calculations using the anatomical library, including but not limited to, converting raw data into matrices, transforming and normalizing the data, and calculating output data, which can be obtained through regression analysis. Using the processed data, the processor derives an internal anatomical point or a plurality of internal anatomical points.

Figure 6A:
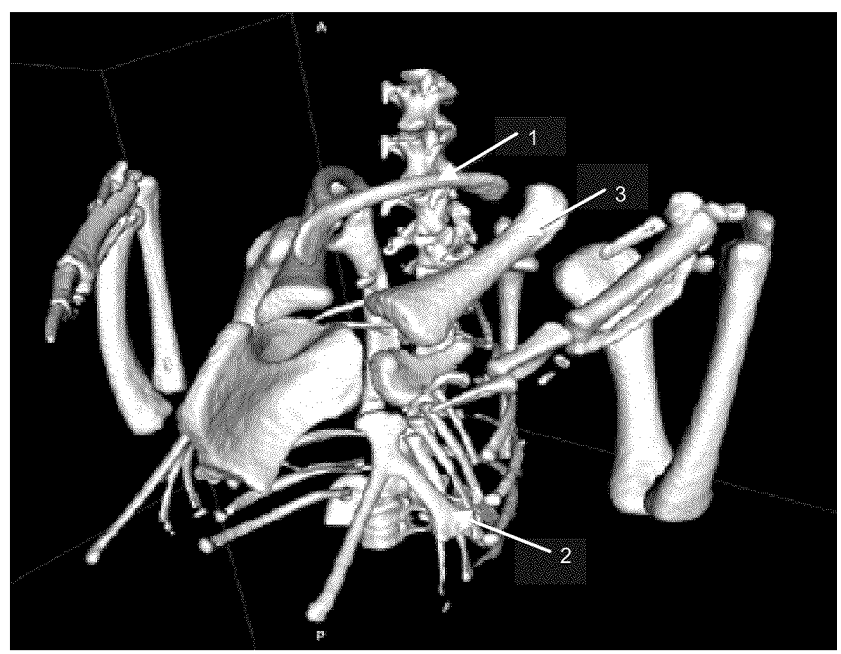
FIG. 6A illustrates a skeletal representation of a chicken.
Figure 6B:
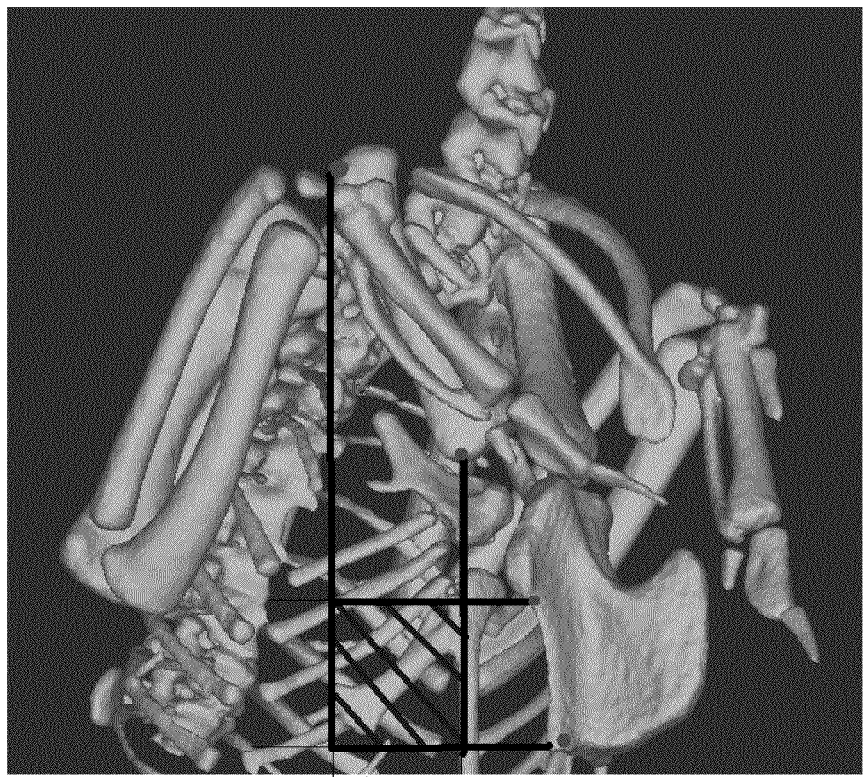
FIG. 6B illustrates the location of the fan bone using the coracoid and keel.

For example, the location of the fan bone can be determined using the coracoid and the keel (FIG. 6B). Assuming the bird is in a cone, the steps to identify the location of the fan bone using the coracoid and keel are as follows: (1) detect axis line along keel; (2) project horizontal lines perpendicular to the line in (1)—one line at the bottom of the keel and one line at the curve beneath the keel bump; (3) project vertical lines perpendicular to the keel lines in (2)—one at the top of the coracoid on each side and one at the bottom of the coracoid on each side; and (4) the fan bone is located in the area of intersection. (FIG. 6B). Similarly, the clavicle tip can be located by using a fixed distance in the sagittal place and the length of the coracoid.

The derived internal anatomical point can then be outputted to a user interface or a machine. The outputted data can be binary (e.g., a bone is missing or it is not) or the outputted data can be numeric (e.g., identification of a coordinate point or path of interest, yield of the deboning process). Further, if the outputted data is a location of coordinate point or path of interest, this location can be provided as one dimensionally, two dimensionally, or three dimensionally. If the outputted data pertains to the yield of the deboning process, the user could be provided with various information, including but not limited to the amount of meat left on carcass, an estimate of weight, or trends related to the deboning process (e.g., worker performance, efficacy of an automated deboning process, calculation of machine wear out). Thus, this method provides for an adaptable system based upon anatomical structure for a specific carcass as opposed to a general classification of a carcass.

All patents, patent applications, and references included herein are specifically incorporated by reference in their entireties.

It should be understood, of course, that the foregoing relates only to exemplary embodiments of the present invention and that numerous modifications or alterations may be made therein without departing from the spirit and the scope of the invention as set forth in this disclosure. Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The present invention is further illustrated by way of the examples contained herein, which are provided for clarity of understanding. The exemplary embodiments should not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention or the scope of the appended claims.

EXAMPLES

Example 1

Proactive Detection of Bones in Poultry Processing

In this example, inspection is conducted on the cone line during the deboning steps close to the critical operations to allow for the ability to take action once a problem in the deboning process is detected. In deboning poultry, one critical step is the removal of the breast meat (sometimes referred to as the butterfly). In this example, bone inspection is performed as part of the deboning process. This would be accomplished by examining the carcass on the cone. One step in the process of preventing foreign material contamination is that of source control. This could be considered an application of a source control strategy where you attempt to control or contain the foreign material before it reaches the product.

In one embodiment, the technique works by using a plastic version of a cone. Plastic is an exemplary material for this example as it is transparent. However, one or ordinary skill in the art would readily realize that the design and material of the cone can be adapted based upon the electromagnetic radiation source and respective sensors. In this example, high density polyethylene (HDPE) was selected as it is both food safe and transmits the wavelengths of radiation of interest. Modifications were made to an HPPE cone (e.g., use of a hollow cone) to accommodate a high intensity LED that produces energy in the IR. The configuration is illustrated in FIG. 2A.

In this example, the system for detecting a material in a carcass scans the carcass during or right at the end of the deboning process. This system includes several elements, as depicted in FIG. 3. The system comprises an illumination subsystem, which is a high intensity LED embedded in a cone, shown in FIG. 2A, driven by a computer controlled power supply. The image capturing subsystem comprises three cameras, which are three PixeLINK (Model No. B741EF) monochrome cameras having an optical band pass filter centered at 850 nanometers. Three cameras are used to allow for the acquisition of images from the center and left and right of the frames. The system is operated in a strobed mode in which the images from the three cameras are acquired simultaneously or near simultaneously. The overall system operation and control is illustrated by the block diagram in FIG. 4. Software for overall control of the system is written in C++.

A skeleton of a typical chicken is illustrated in FIG. 6A. The bones that are of interest are numbered in FIG. 6A, the clavicle (1) and fan bone (2). In the deboning process, problems usually arise when either the clavicle and or the fan bone become dislodged during the process of removing the butterfly and end up in the meat being processed. To be able to see these bones on the carcass, a number of configurations for the cameras were tested. In an exemplary embodiment, the cameras are configured to provide three backlit views of each carcass, one from each side and one center view. In addition, images are taken at two power levels; the higher levels directed to detect the harder clavicle bone and the lower level directed to detect the softer fan bone. Examples of these images are shown in FIG. 7. These images are not unlike X-ray images in their characteristics (dynamic range/contrast). FIGS. 7A-C shows the output from the left side camera (FIG. 7A), the center camera (FIG. 7B) and the right side camera (FIG. 7C) at high power (31V). The images in FIG. 7D-F show the same images at lower power (14V). The lower power images were taken because at the higher power for detecting the clavicle, the sensor saturates and the fan bones are not observable.

Figure 10A:
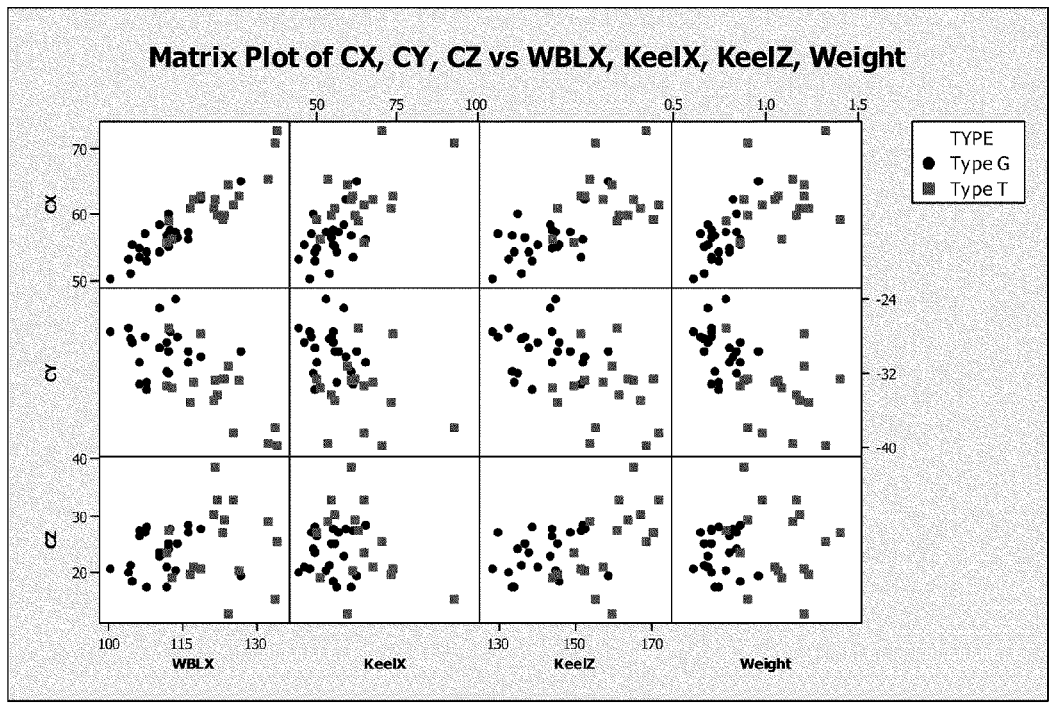
FIG. 10A graphically depicts the central clavicle point matrix plot of CX, CY, CZ versus WBLX, Kee1X, Kee1Z, Weight.
Figure 10B:
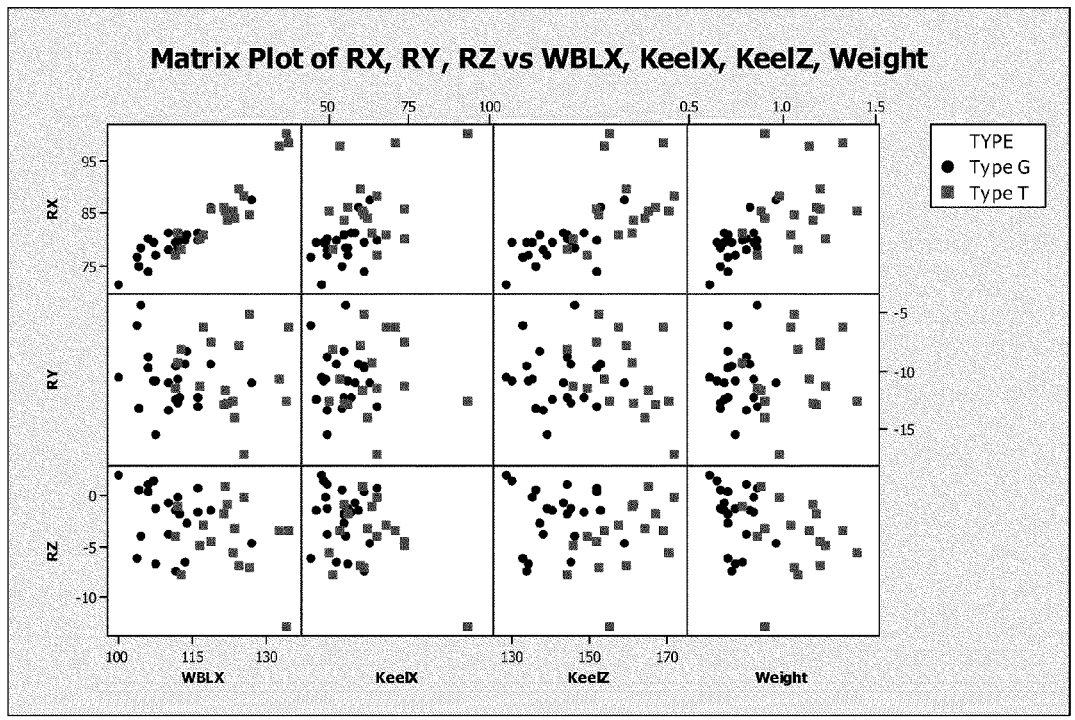
FIG. 10B graphically depicts the right clavicle point matrix plot of RX, RY, RZ versus WBLX, Kee1X, Kee1Z, Weight.
Figure 10C:
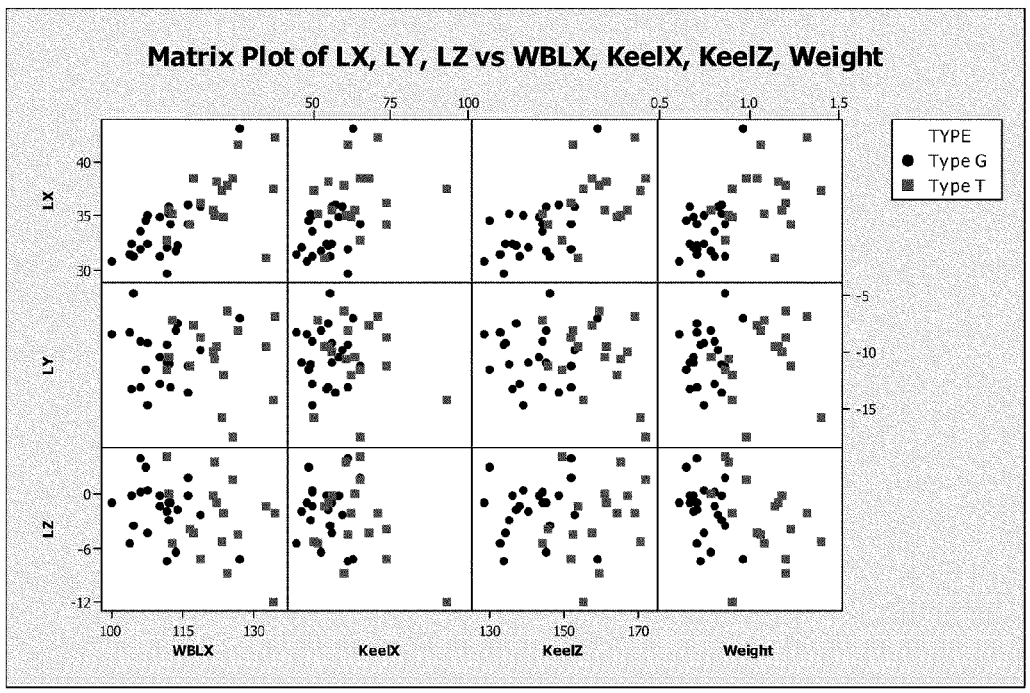
FIG. 10C graphically depicts the left clavicle point matrix plot of LX, LY, LZ versus WBLX, Kee1X, Kee1Z, Weight.
Figure 11A:
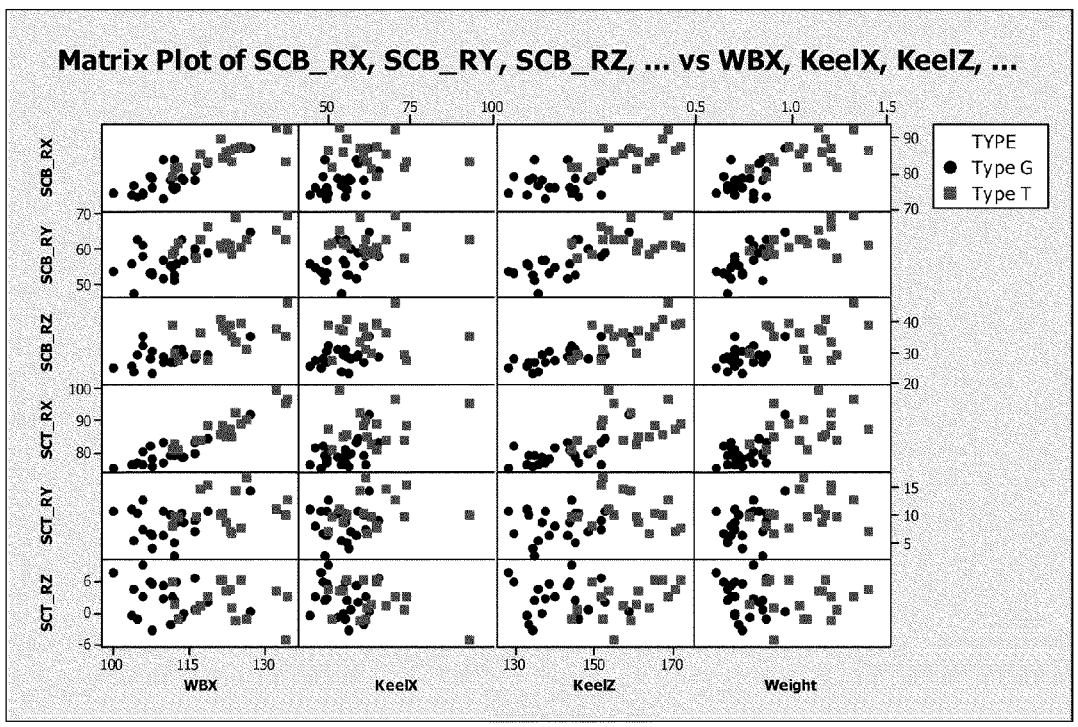
FIG. 11A graphically depicts the right scapula matrix plot of SCB_RX, SCB_RY, SCB_RZ versus WBLX, Kee1X, Kee1Z, Weight.
Figure 11B:
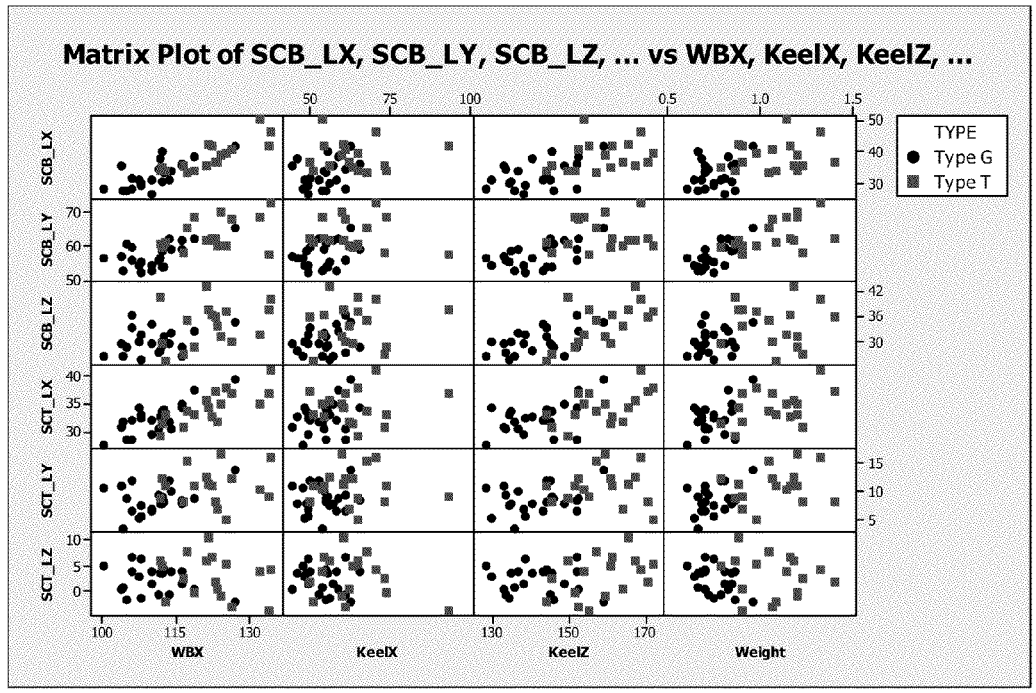
FIG. 11B graphically depicts the right scapula matrix plot of SCB_LX, SCB_LY, SCB_LZ versus WBLX, Kee1X, Kee1Z, Weight.

The sequence of images shown in FIG. 10 illustrates the operations as well as the results of processing the images. This approach is more tractable for image analysis as now the operations do not have to be done globally but only on the much smaller defined regions of interest. The process begins by locating the bone labeled 3 in FIG. 6A, which is called the coracoid. This is then used as a reference for location of the clavicle bone region and the fan bone region. The use of the coracoid as a reference helps to accommodate the variability in the carcass due to changes in size or displacement due to material handling. The anatomical relationships then guide the location of the points of interest. Further processing is then done on each region to determine the presence or absence of the bones. The steps comprise thresholding, feature extraction, and classification. As mentioned earlier, the images are somewhat like X-ray images in character. The benefit of this approach is that the processing does not have to be done globally as we can focus on specific regions which make the processing more tractable. Several techniques were tried for performing the processing utilizing various pre-processing and classification approaches. Currently, a heuristic approach is being used for the testing and evaluation and was used to generate the results in this example.

The process versions of these images are shown in FIG. 8. FIG. 8A shows the processing of the left bright image, where the coracoid is located and the fan bone region is extracted as displayed in the bottom right portion of the image. FIG. 8D show similar processing for the dark image to highlight the region of the fan bone. FIG. 8B shows the processing for the center image. The sequence of operations is to process the center of the image, and then to support the decision based on the outputs of the left and right images. Similar processing used in FIGS. 8C and E for the high power and low power right side images, respectively. The processed image for a sample without the clavicle bone is shown in FIG. 9.

Figure 5:
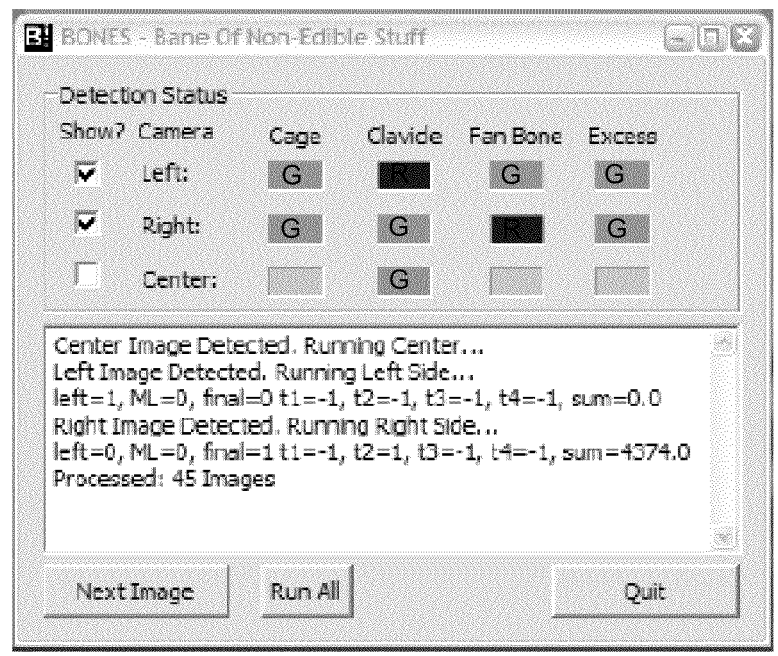
FIG. 5 is an exemplary screenshot of a user interface of a system for detecting a bone in a carcass.

Once decisions have been made concerning the presence or absence of bones, the user interface shown in FIG. 5 is used to report the result to the user. Green (indicated by a "G") means that the relevant bones are still in place on the carcass and therefore not in the processed meat associated with that cage, whereas Red (indicated by an "R") means the relevant bones are missing from the carcass. The column marked excess is used to determine whether or not there is excess meat on the frame, which is information that could be fed back into the process for monitoring and control of the deboning process. As more data is acquired with regards to the carcasses, learning algorithms can be used to enhance the bone detection and process control functionality. These algorithms can be specifically adapted to specific processors as each facility is a little different and serves different customers.

The process of developing this example utilized over 1000 birds. In order to evaluate the performance of the system, about 200 birds were used for this evaluation. The analysis of the data of indicates that better performance is obtained if inspection is done at the end of the line when the tenders (tenders are small muscles that are covered by the breast meat) have been removed. However, the inspection can be performed further upstream of tender removal (for example, immediately after the butterfly is removed) as there would be more flexibility in the actions that could be taken to remedy processing problems. For example, if inspection were moved upstream of tender removal, there would be no need to track the product and the frame, and removal of suspect product would be immediate. This, however, would require that the tenders would be in place, which may affect the accuracy of the process.

The results from the testing for product, which had the tenders removed, are presented in Table 1.

TABLE 1

Accuracy of System Performance

| | |
|---|---|
| False Positive | 0.5% |
| False Negative | 7.5% |

These data indicate that there is a 0.5% chance that the system would reject a good product and a 7.5% chance that the system would accept a bad product. If we assume a process bone generation rate of 10.1 bones per thousand pounds (average of minimum and maximum observed by one producer) and using the accuracies in Table 1, then a system such as this would have the possibility to allow 1 in every 150,000 customers to see a bone in the output product. This performance would be better than the current techniques at significantly lower cost while providing feedback that could be useful for process monitoring and control.

Example 2

Detection of Cut Points on Front Halves by Using External Measurements

In order to obtain raw material for further processed products, deboning is a major operation in most poultry processing concerns. There are currently both manual and automated approaches to this problem but both techniques could use improvement in the eyes of most producers. A significant operation in the process is the wing cut and the ability to cut the joint tendons and ligaments that facilitate the pulling operation that removes the breast meat. This Example presents an approach for guiding the cutting operation that is capable of adjusting to each bird thereby improving the yield and efficiencies. In this Example, the approach is analyzed using data gathered from two populations of front halves to quantify the efficacy.

The approach used was to collect data on the points of interest on a front half. Using this approach, one is able to correlate external measurements on the bird carcass with the internal cut points of interest. In this manner, those points might be easier to measure yet provide the information needed to guide cutting operations while accommodating the variability of the product.

Figure 6C:
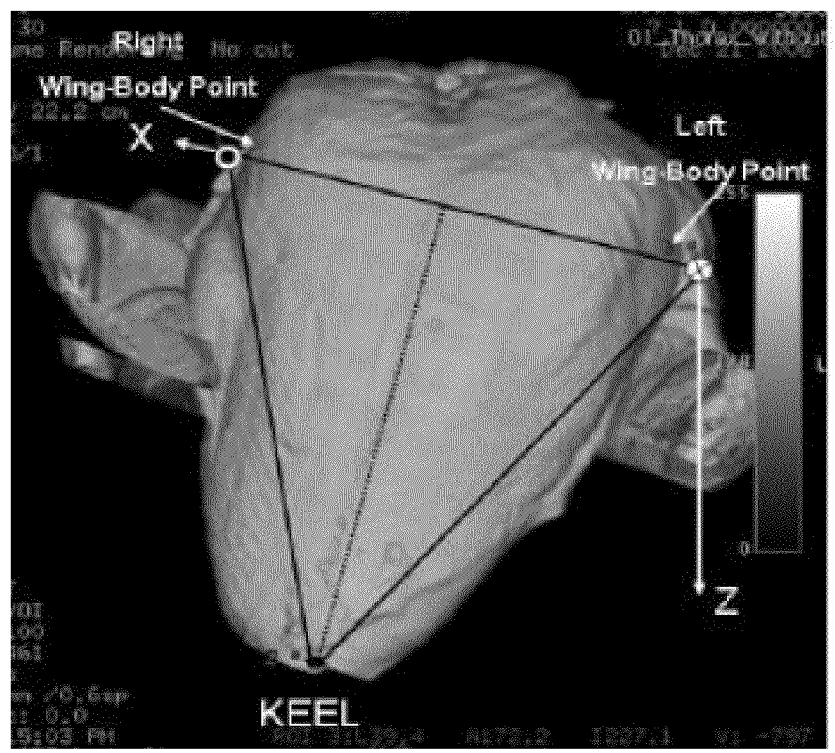
FIG. 6C illustrates the keel and the intersection between the breast and the wing-fronts (WBX).

Data Acquisition. Front halves were acquired from two different sources in order to evaluate the effect of bird types. Two proprietary genetic strains of chickens, termed Type T and Type G, were used in this Example. Briefly, the front halves were placed on a frame where the external measurements could be made. Five external measurements were made: the top and bottom of the intersections of both wings with the body of the bird along with the keel tip. The locations of these external points are shown in FIG. 6C.

The bird was then 'lightly' dissected so as not to sever the major tendons and ligaments in order not to change the relative positions of the points of interest for deboning. These points included: the location of the shoulder tendons and ligaments and locations that the reflected the beginning and end of the clavicle along with points intermediate. Additionally, CAT scan data of some front halves were generated as one mechanism to validate the relationships obtained using the FARO generated data.

The approach utilized in the analysis was to conduct statistical hypothesis tests on the probability of relationships of the external points to the internal points of interest. Several tests were conducted in order that we could have a better understanding of the relationships. These tests included: coordinate transformations (raw, relative, transformed); Estimating the cut points (upper and lower points on wing front); looking at weight as a predictor; predicting weight by dimensions; evaluating the effect of spreading the wings; effect of bird type on the correlations; and location of clavicle and scapula points. The statistical tools utilized for the analysis were the t-test, ANOVA and Linear Regression. Most of the analysis was done using Minitab with Matlab for performing some data reduction functions.

Transformations. There are three sets of data used in the analysis. Two sets of data were taken using the FARO measurement system termed here N29 and N40. Within these data two genetic strains of bird were evaluated. In addition, data was obtained from CAT scans of front halves. This data is represented in three ways. The first representation is the raw data taken relative to a reference point on the measurement jig. This reference is also changed to the upper and lower wing point for the second representation, and in the third representation, it is transformed to a frame formed from an orthogonal system based on the plane made from the keel point, and the two wing points. In this example, these data sets are called raw, relative and transformed, respectively.

For convenience, various abbreviations are used throughout the specification and examples. For instance, WBX refers to the Euclidean distance between the intersections of the breast with the left and right wing fronts. JX refers to the Euclidean distance along the WBX axis (coronal plane) between the top middle of the wings shoulder medial ligaments and their respective intersection between the breast and the wing-fronts. (Note: the coronal plane is formed by the keel tip, and the intersections between the breast and the wing-fronts). JY refers to the Euclidean distance along the transverse plane between the top middle of the wings shoulder tendons and the WBX axis. JZ refers to the Euclidean distance along the sagittal plane between the top middle of the wings shoulder tendons and the WBX axis. Kee1X refers to the minimum component of the Chebyshev distance along the coronal plane between the keel tip and WBX. Kee1Z refers to the maximum component of the Chebyshev distance along the coronal plane between the keel tip and WBX. If the term "_lower" is used (e.g., JX_lower), it means that the "wingpit" inflexion points were used to calculate the WBX rather than the intersection of the breast and wing-fronts.

TABLE 2

N40 - Type T and Type G combined

| Variable | Unit | Mean | StDev | Minimum | Maximum | Range |
|---|---|---|---|---|---|---|
| Weight | Kg | 0.9 | 0.2 | 0.6 | 1.4 | 0.8 |
| WBX | Mm | 115.8 | 8.7 | 100.0 | 134.7 | 34.7 |
| KeelX | Mm | 58.2 | 9.3 | 44.4 | 93.2 | 48.8 |
| KeelZ | Mm | 149.0 | 12.1 | 127.9 | 172.4 | 44.5 |
| JX | Mm | 18.4 | 2.7 | 11.5 | 23.3 | 11.8 |
| JY | Mm | 3.5 | 2.3 | -3.1 | 8.0 | 11.1 |
| JZ | Mm | -3.1 | 2.4 | -8.3 | 3.2 | 11.5 |

TABLE 3

N40 - Divided by Type T and Type G

| Variable | Unit | Type | N | Mean | StDev | Minimum | Maximum | Range |
|---|---|---|---|---|---|---|---|---|
| Weight | Kg | G | 22 | 0.7 | 0.1 | 0.6 | 1.0 | 0.4 |
|  | Kg | T | 17 | 1.1 | 0.2 | 0.8 | 1.4 | 0.6 |
| WBX | Mm | G | 22 | 110.7 | 5.9 | 100.0 | 127.1 | 27.1 |
|  | Mm | T | 17 | 122.4 | 7.1 | 111.8 | 134.7 | 22.9 |
| KeelX | Mm | G | 22 | 54.1 | 5.7 | 44.4 | 65.2 | 20.8 |
|  | Mm | T | 17 | 63.5 | 10.5 | 50.1 | 93.2 | 43.1 |
| KeelZ | Mm | G | 22 | 141.4 | 8.2 | 127.9 | 158.9 | 31.1 |
|  | Mm | T | 17 | 158.9 | 8.7 | 144.1 | 172.4 | 28.3 |
| JX | Mm | G | 22 | 18.0 | 2.6 | 11.5 | 21.6 | 10.1 |
|  | Mm | T | 17 | 18.9 | 2.7 | 13.5 | 23.3 | 9.8 |
| JY | Mm | G | 22 | 3.5 | 2.3 | -3.1 | 8.0 | 11.1 |
|  | Mm | T | 17 | 3.4 | 2.5 | -1.9 | 6.8 | 8.7 |

TABLE 3-continued

N40 - Divided by Type T and Type G

| Variable | Unit | Type | N | Mean | StDev | Minimum | Maximum | Range |
|---|---|---|---|---|---|---|---|---|
| JZ | Mm | G | 22 | -2.7 | 2.6 | -8.3 | 3.2 | 11.5 |
|  | Mm | T | 17 | -3.6 | 2.2 | -7.5 | -0.8 | 6.7 |

Location of Cut Points. The first item of interest was how accurately one would be able to estimate the location of the cut points using the external points identified above.

Regression Analysis: JX versus WBX

The regression equation is
JX = -3.61 + 0.873 WBX

| Predictor | Coef | SE Coef | T | P |
|---|---|---|---|---|
| Constant | -3.613 | 5.372 | -0.67 | 0.505 |
| WBX | 0.87260 | 0.04627 | 18.86 | 0.000 |

S = 2.47293 R-Sq = 90.6
Analysis of Variance

| Source | DF | SS | MS | F | P |
|---|---|---|---|---|---|
| Regression | 1 | 2174.7 | 2174.7 | 355.61 | 0.000 |
| Residual Error | 37 | 226.3 | 6.1 |  |  |
| Total | 38 | 2401.0 |  |  |  |

VALIDATION-With N29 we calculate the MSRP as follows:
The MSRP for N29 using the equation JX = -3.61 + 0.873 WBX, is 5.24 which is smaller than the MSE (6.1.)

$$MSRP = \frac{\sum_{i=1}^{n^*} (y_i - \hat{y}_i)^2}{n^*}$$

Coordinates Y and Z cut points estimates would be offset values equal to the average of the sample since they could not be fitted within a regression model using body measures relative to "upper" wing-body points. However, when the data is relative to the "lower" wing-body points WBX is also a significant factor of JY and JZ. As used herein, the term "wing-body point" refers to the external cutaneous inflexion point between the triceps brachii and the coracobrachialis ventralis.

Other Formulas to Locate Anatomical Positions from External Dimensions.
JX=-3.61+0.873 WBX (right side)
JX_Lower=0.04+0.990 WBX (right side) JY_Lower=-12.5-0.283 WBX JZ_Lower=11.2 -0.382 WBX+0.213 Kee1X
JX_Lower=56.7+23.4 Weight
JY_Lower=-23.0-14.3 Weight
JZ_Lower=-0.90-11.4 Weight
CX=-0.955+0.5166 WBX
CY=1.20-0.280 WBX
CZ=-3.32+0.184 Kee1Z
CZ=-49.7+0.471 Kee1Z (TYPE T)
RX=3.45+0.681 WBX
RY=15.1-0.161 Kee1Z (TYPE T)
RZ=10.0+0.143 Kee1Z-0.296 WBX
LX=6.31+0.247 WBX
LY=12.8-0.146 Kee1Z (TYPE T)
LZ=9.26-0.333 WBX+0.182 Kee1Z
SCB_RX=19.2+0.535 WBX
SCB_RY=43.1+17.6 Weight
SCB_RY=26.8+0.226 WBX+7.25 Weight
SCB_RY=11.7+0.407 WBX
SCB_RZ=-24.2+0.375 Kee1Z

SCT_RX=7.39+0.658 WBX

SCT_RY=3.83+6.60 Weight

SCT_RY=−6.66+0.142 WBX

SCT_RZ=−0.13−0.169 Kee1X+0.0845 Kee1Z

SCT_RZ=−9.7−0.259 WBX+0.280 Kee1Z (TYPE T)

SCB_LX=−26.94+0.5373 WBX

SCB_LY=43.6+18.4 Weight

SCB_LY=26.8+0.187 WBX+12.8 Weight

SCB_LY=12.4+0.410 WBX

SCB_LZ=−5.71+0.252 Kee1Z

SCT_LX=2.33+0.268 WBX

SCT_LY=3.64+6.89 Weight

SCT_LY=−6.55+0.141 WBX

SCT_LZ=−9.7+0.280 Kee1Z−0.259 WBX (TYPE T)

Weight as the Factor to Locate Cutting Points. The current industry procedure for handling the variability in the product for automatic deboning is to use weight. In this section, this approach is compared to using measurements on the carcass. In the cases of JX and JY, weight is a significant factor but not enough to be a sole predictor for the cut points. The results of analyzing the relative data with the weight provide some insight, such as the model $R^2$ is higher with the Type G chickens.

Calculating Weight from Dimensions. Another interest area is the possibility for calculating weight based on external measurements as it is possible to make these measurements more easily than making the weight measurements. The results from the regression analysis indicate that the distance between the wing-body points is a statistical significant predictor of the weight. One consideration is the ability to calculate weight with a body measurement, as this demonstrates some variability. On the validation of the model as demonstrated in Table 4, the fitted value was on average within 12% of the real value. However, the prediction intervals are—on average—just 14% smaller than the range of weights.

TABLE 4

| Data | Measure | Unit | Type G |
| --- | --- | --- | --- |
| N12 Robot | $R^2$ | % | 90.20% |
| (Closed wings, only Type G, | S | grams | 57.2 |
| measured with robot, relative | Average Residual | grams | 73.2 |
| data to upper points) | PI 95% bandwidth | grams | 308.3 |
|  | Average ABS (1-Fit/Real) | % | 12% |
| N40 FARO | $R^2$ | % | 41.60% |
| (Spanned wings, Type G data, | S | grams | 69.8 |
| measured with FARO, relative | Average Residual | grams | 63 |
| data to upper points) | PI 95% bandwidth | grams | 311.3 |
|  | Average ABS (1-Fit/Real) | % | 8% |

Effect of wing spread. As the front half is manipulated for cutting it is possible the cut points could move and the joint could stretch reducing the gap that would allow an effective cut of the ligaments without cutting bone chips. The aim here is to look at what could happen as the wings are moved. The short answer is: yes, the joint gaps reduce as the wings are spanned. The paired t-test on two chickens indicates that spanning the wings just 20 degrees without pulling them may reduce the width of the joints.

Paired T-Test and CI: Closed, Spanned
Paired T for Closed - Spanned

|  | N | Mean | StDev | SE Mean |
| --- | --- | --- | --- | --- |
| Closed | 4 | 15.0575 | 1.3760 | 0.6880 |
| Spanned | 4 | 10.8625 | 1.1278 | 0.5639 |
| Difference | 4 | 4.19500 | 1.74074 | 0.87037 |

95% CI for mean difference: (1.42510, 6.96490)
T-Test of mean difference = 0 (vs not = 0):
T-Value = 4.82
P-Value = 0.017

In the same vein, the paired t-test on two chickens indicates that spanning the wings just 20 degrees—without pulling them—increases the distance between the wing-body point and the cut point.

Paired T-Test and CI: Closed_CutPoint-WB_distance, Spanned_CutPoint-WB_distance
Paired T for Closed_CutPoint-WB_distance - Spanned_CutPoint-WB_distance

|  | N | Mean | StDev | SE Mean |
| --- | --- | --- | --- | --- |
| Closed_CutPoint- | 4 | 19.1725 | 1.3211 | 0.6606 |
| Spanned_CutPoint | 4 | 23.9400 | 2.6848 | 1.3424 |
| Difference | 4 | −4.76750 | 1.80191 | 0.90096 |

95% CI for mean difference: (−7.63475, −1.90025)
T-Test of mean difference = 0 (vs not = 0):
T-Value = −5.29
P-Value = 0.013

However, the paired t-test on two chickens indicates that spanning the wings just 20 degrees—without pulling them—does not significantly changes the position of the shoulder medial ligaments' points closer to the center of the chicken.

Paired T-Test and CI: CLOSED, SPANNED
Paired T for CLOSED - SPANNED

|  | N | Mean | StDev | SE Mean |
| --- | --- | --- | --- | --- |
| CLOSED | 4 | 53.6525 | 31.9534 | 15.9767 |
| SPANNED | 4 | 56.8082 | 33.3679 | 16.6839 |
| Difference | 4 | −3.15567 | 7.61749 | 3.80875 |

95% CI for mean difference: (−15.27680, 8.96546)
T-Test of mean difference = 0 (vs not = 0):
T-Value = −0.83
P-Value = 0.468

Bird Type Effects. Different genetic strains of birds are processed by different producers. The technique being investigated works despite the anatomical differences (i.e., weight, WBX) shown below: further refinement to accommodate in some way these differences improves the effectiveness of the method. The weight and the body measures are statistically different between Type G and Type T chickens.

Comparison Weights
Two-sample T for Weight

| TYPE | N | Mean | StDev | SE Mean |
|---|---|---|---|---|
| Type G | 22 | 0.7491 | 0.0892 | 0.019 |
| Type T | 17 | 1.077 | 0.174 | 0.042 |

Difference = mu (Type G) − mu (Type T)
Estimate for difference: −0.327968
95% CI for difference: (−0.424118, −0.231818)
T-Test of difference = 0 (vs not =):
T-Value = −7.07
P-Value = 0.000
DF = 22

Comparison WBX
Two-sample T for WBX

| TYPE | N | Mean | StDev | SE Mean |
|---|---|---|---|---|
| Type G | 22 | 110.68 | 5.93 | 1.3 |
| Type T | 17 | 122.38 | 7.09 | 1.7 |

Difference = mu (Type G) − mu (Type T)
Estimate for difference: −11.6989
95% CI for difference: (−16.0530, −7.3447)
T-Test of difference = 0 (vs not =):
T-Value = −5.48
P-Value = 0.000
DF = 31

Comparison KeelZ
Two-sample T for KeelZ

| TYPE | N | Mean | StDev | SE Mean |
|---|---|---|---|---|
| Type G | 22 | 141.43 | 8.21 | 1.8 |
| Type T | 17 | 158.85 | 8.65 | 2.1 |

Difference = mu (Type G) − mu (Type T)
Estimate for difference: −17.4163
95% CI for difference: (−22.9767, −11.8560)
T-Test of difference = 0 (vs not =):
T-Value = −6.37
P-Value = 0.000
DF = 33

The location of the cutting points in the X axis is the only one statistically different between Type G and Type T chickens with "upper" data.

Comparison JX
Two-sample T for JX

| TYPE | N | Mean | StDev | SE Mean |
|---|---|---|---|---|
| Type G | 22 | 92.73 | 4.63 | 0.99 |
| Type T | 17 | 103.48 | 7.25 | 1.8 |

Difference = mu (Type G) − mu (Type T)
Estimate for difference: −10.7525
95% CI for difference: (−14.9069, −6.5980)
T-Test of difference = 0 (vs not =):
T-Value = −5.33
P-Value = 0.000
DF = 25

Comparison JY
Two-sample T for JY

| TYPE | N | Mean | StDev | SE Mean |
|---|---|---|---|---|
| Type G | 22 | 3.50 | 2.27 | 0.48 |
| Type T | 17 | 3.41 | 2.47 | 0.60 |

Difference = mu (Type G) − mu (Type T)
Estimate for difference: 0.092552
95% CI for difference: (−1.472516, 1.657621)
T-Test of difference = 0 (vs not =):
T-Value = 0.12
P-Value = 0.905
DF = 33

Comparison JZ
Two-sample T for JZ

| TYPE | N | Mean | StDev | SE Mean |
|---|---|---|---|---|
| Type G | 22 | −2.72 | 2.60 | 0.55 |
| Type T | 17 | −3.62 | 2.16 | 0.52 |

Difference = mu (Type G) − mu (Type T)
Estimate for difference: 0.896915
95% CI for difference: (−0.649082, 2.442912)
T-Test of difference = 0 (vs not =):
T-Value = 1.18
P-Value = 0.247
DF = 36

In addition to the X axis, the location of the cutting points in the Z axis is also statistically different between Type G and Type T chickens with "lower" data.

Comparison JX_LOWER
Two-sample T for JX_LOWER

| TYPE | N | Mean | StDev | SE Mean |
|---|---|---|---|---|
| G | 21 | 74.79 | 2.51 | 0.55 |
| T | 17 | 81.64 | 5.12 | 1.2 |

Difference = mu (G) − mu (T)
Estimate for difference: −6.85033
95% CI for difference: (−9.66643, −4.03423)
T-Test of difference = 0 (vs not =):
T-Value = −5.04
P-Value = 0.000
DF = 22

Comparison JY_LOWER
Two-sample T for JY_LOWER

| TYPE | N | Mean | StDev | SE Mean |
|---|---|---|---|---|
| G | 21 | −33.93 | 1.87 | 0.41 |
| T | 17 | −35.68 | 4.21 | 1.0 |

Difference = mu (G) − mu (T)
Estimate for difference: 1.75860
95% CI for difference: (−0.52831, 4.04552)
T-Test of difference = 0 (vs not =):
T-Value = 1.60
P-Value = 0.125
DF = 21

| Comparison JZ_LOWER Two-sample T for JZ_LOWER | | | | |
|---|---|---|---|---|
| TYPE | N | Mean | StDev | SE Mean |
| G | 21 | −9.46 | 2.36 | 0.52 |
| T | 17 | −13.02 | 4.11 | 1.0 |

Difference = mu (G) − mu (T)
Estimate for difference: 3.56250
95% CI for difference: (1.24796, 5.87704)
T-Test of difference = 0 (vs not =):
T-Value = 3.18
P-Value = 0.004
DF = 24

Location of scapula and clavicle points. The cut points of interest identified in FIGS. 10A-C and FIGS. 11A-B are just the starting point. Trajectories for actually making the cuts are needed in the end to guide the cutting points. The manual trajectories that are used today in general use the clavicle and scapula as guides and the ability locate these points are important for guiding the overall process. As in the location of the cutting points, the X values could be expressed as a function of WBX for the clavicle as well as the scapula. Also, the Y values could be expressed as a function of the WBX, the Weight, and the Kee1Z.

Example 3

Determination of Cutting Trajectory for Deboning

In this Example, a set of carcasses was used to determine the average splines that minimize the cutting error. In this Example, the upper regression analysis of the Example 2 was used with the new splines to understand how accurate one can predict the complete cutting trajectory based only on external measurements. Based upon the data generated in this example, the following conclusion can be drawn: (1) the cutting should start just above the top part of the clavicle tip; (2) the trajectory per chicken type is significantly better than an overall average trajectory; (3) two second order polynomials, one for the clavicle and one for the scapula, express the cutting trajectory more accurately than one higher order polynomial; (4) normalizing by WBX reduces the error; and (5) clavicle trajectory is better predicted using X as the independent variable, while for Y works better for the scapula.

In general, one trajectory spline has an average error of 6.5 millimeters with a standard deviation of 3.99 millimeters. When normalizing by WBX, the mean error drops to 5.13 millimeters with a standard deviation of 3.00 millimeters. The assumption is that the Ys values are precisely known at the critical cutting points.

When WBX is used to locate the critical cutting points, and we only one normalized trajectory spline is used, the average errors are the following: 22.31 millimeters from the clavicle tip, 7.54 millimeters from the clavicle top, 10.01 millimeters from the scapula top, and 9.39 millimeters from the scapula bottom. When the one-normalized-trajectory-spline is split, the average errors are the following: 8.6 millimeters from the clavicle tip, 7.0 millimeters from the clavicle top, 10.15 millimeters from the scapula top, and 9.7 millimeters from the scapula bottom. Knowing the Ys on the scapulas and the Xs on the clavicle—using normalized split curves, the mean distance between the predictions and the real values are the following: 8. millimeters right clavicle, 6.0 millimeters left clavicle (4.8 millimeters when removing the tip point), 7.5 millimeters right scapula, and 5.3 millimeters left scapula.

In this Example, the N29 data gathered from two populations was analyzed—one set was randomly selected for the analysis and the other set was used to validate the results.

Overview of the Analysis Process. There are two sets of data available for the analysis. The data was collected using the FARO measurement system and CAT scans, referred as N29 and N12 respectively. This data is represented in four ways. The first is the raw data taken relative to a reference point on the measurement jig. This reference is also changed to the upper wing point for the second representation and in the third it is transformed to a frame formed from an orthogonal system based on the plane made from the keel point, and the two wing points. The last set of data results was obtained by dividing the previous set by the respective distance between the wing-body points. In this Example, these data sets are called raw, relative, transformed and normalized, respectively. The N29 in its transformed and normalized representations was used for the analysis and N12 for confirmation.

Figure 12:
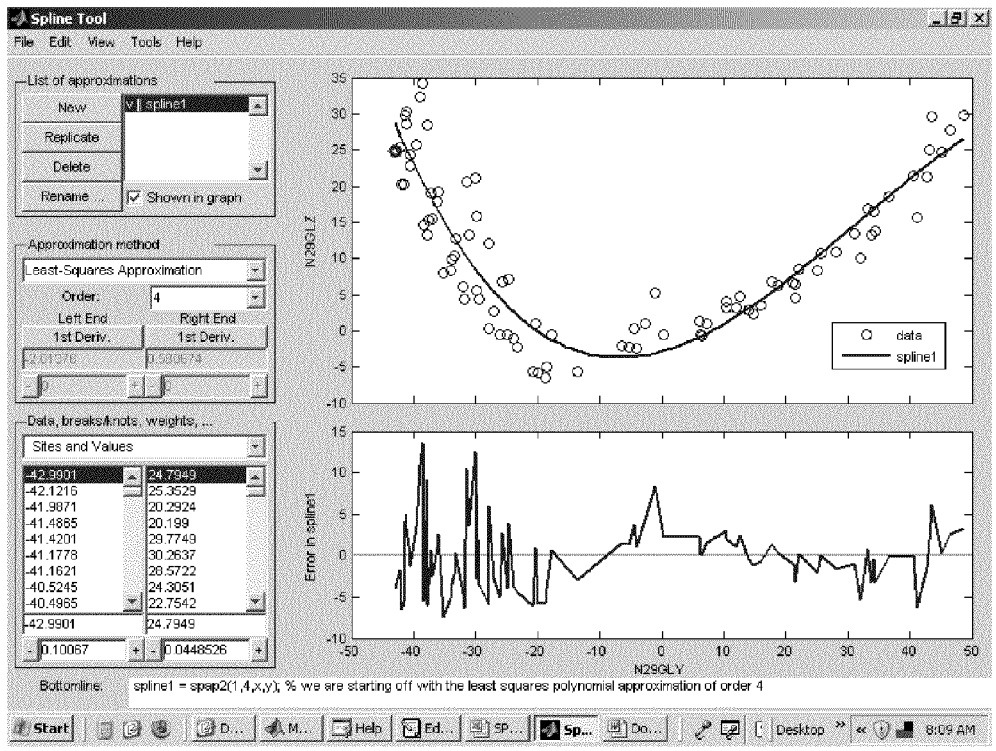
FIG. 12 is a screenshot of a general output of Matlab's Spline Toolbox.

Matlab® was used to arrange the data in such a way that the Spline Toolbox® could be used for the analysis. Several sets of arrays were created depending on the type of data; for example, the body part (clavicle or scapula), the position of the points (right or left) and the data representation (transformed or normalized.) Using the Spline Toolbox®, the spline was generated by applying the method of the Least-Square Approximation with the least possible order that could represent the data set. A sample of the output is shown in FIG. 12.

Figure 13:
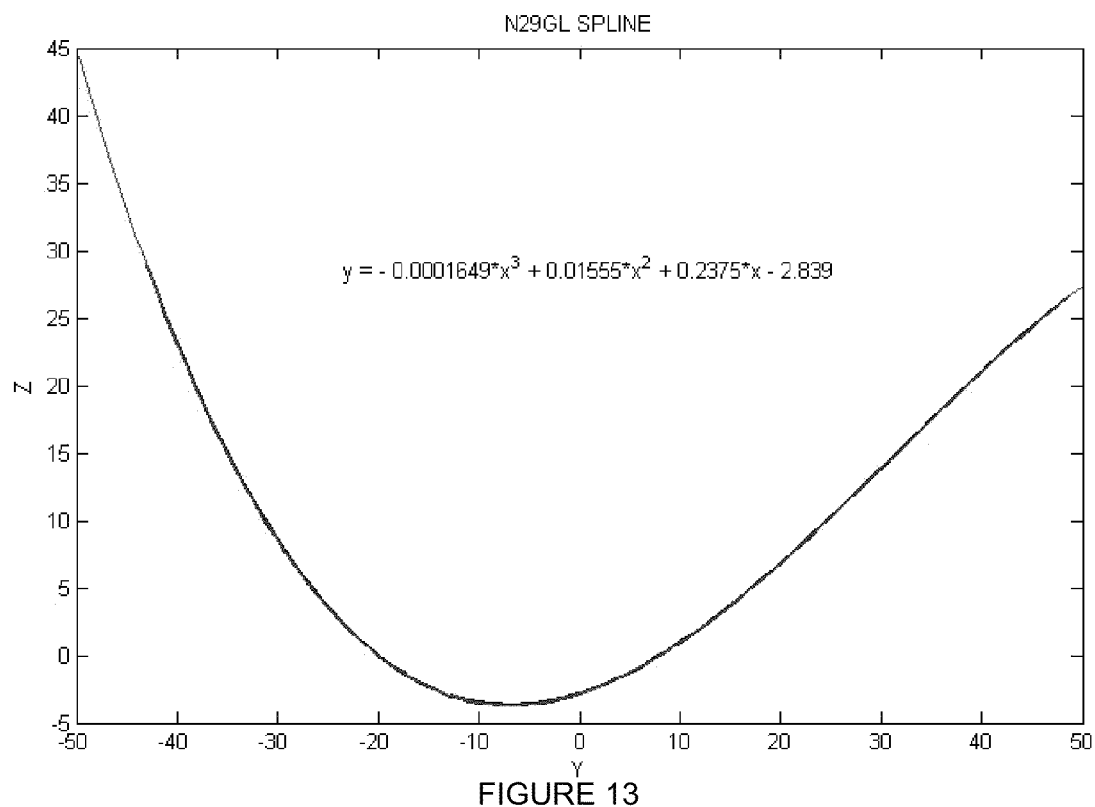
FIG. 13 is a screenshot of a general output of Matlab's Fitting Tool.

Since the spline just works within a given range, the spline was plotted and Matlab's fitting utility (FIG. 13) was used to determine its polynomial expression. Then, the spline is validated with an additional data set calculating the average Euclidean distance between the 3D spline trajectory and the real data points.

The general equations that we obtain from the analysis are the following:

SPLINE_TRAJECTORY_YXL: $X = -0.0000685Y^3 + 0.00589Y^2 - 0.0302Y + 34.4$

SPLINE_TRAJECTORY_YXR: $X = 0.0000744Y^3 - 0.00393Y^2 + 0.0939Y + 79$

SPLINE_TRAJECTORY_YZ: $Z = -0.000137Y^3 + 0.0134Y^2 + 0.218Y - 4.83$

SPLINE_TRAJECTORY_YXLN: $X = -0.86Y^3 + 0.719Y^2 - 0.0722Y + 0.3$

SPLINE_TRAJECTORY_YXRN: $X = 0.863Y^3 - 0.546Y^2 + 0.104Y + 0.697$

SPLINE_TRAJECTORY_YZN: $Z = -2.09Y^3 + 1.64Y^2 + 0.245Y - 0.047$

SPLINE_CLAVICLE_XYR  $Y = 0.025X^2 - 2.72X + 35.2$
SPLINE_CLAVICLE_XYRN  $Y = 3.19X^2 - 2.76X + 0.231$
SPLINE_CLAVICLE_XYL  $Y = 0.0151X^2 - 2.46X + 46.9$
SPLINE_CLAVICLE_XYLN  $Y = 3.8X^2 - 4.2X + 0.78$

SPLINE_CLAVICLE_XZR $\quad Z = -0.0119X^2 + 0.507X + 30.4$
SPLINE_CLAVICLE_XZRN $\quad Z = 0.153X^2 - 1.47X + 0.874$
SPLINE_CLAVICLE_XZL $\quad Z = 0.000726X^2 + 1.14X - 44.5$
SPLINE_CLAVICLE_XZLN $\quad Z = 2.17X^2 - 0.215X - 0.198$ SPLINE_SCAPULA_YZL $\quad X = -0.000442Y^2 + 0.119Y + 33.9$
SPLINE_SCAPULA_YXLN $\quad X = -0.148Y^2 + 0.125Y + 0.303$
SPLINE_SCAPLUA_YXR $\quad X = 0.0014Y^2 + 0.0484Y + 78.1$
SPLINE_SCAPULA_YXRN $\quad X = -0.00414Y^2 + 0.0537Y + 0.689$ SPLINE_SCAPULA_YZ $\quad Z = 0.0515Y^2 + 0.23Y - 2.26$
SPLINE_SCAPULA_YZN $\quad Z = 0.62Y^2 + 0.243Y - 0.0322$
SPLINE_SCAPULA_YZLN $\quad Z = 0.755Y^2 + 0.155Y - 0.0227$ Nomenclature:
Spline_(Segment)_. . .
(Independent Variable)(Dependent Variable)(Opt. Side)(Opt. Normalized)

Example:

SPLINE_SCAPULA_YZLN
SEGMENT: SCAPULA
INDEPENDENT VARIABLE: Y
DEPENDENT VARIABLE: Z
SIDE: Left
NORMALIZED DATA: yes Segments could be: the Complete Trajectory, the Clavicle or the Scapula.
Side could be: Right or Left.

Randomly, a bird from N29 to illustrate how to use the regression formulas as well as the splines. The only data that we need is the distance between the right and left wing-body points (WBX).

WBX=126.6905

We illustrate three cases: (I) use one trajectory spline per side, (II) use two split-splines, one for the clavicle and the other for the scapula, and (III) use one normalized trajectory spline per side.

CASE I—USING ONE TRAJECTORY SPLINE. In this case, Y was used as the independent variable while X and Z are dependent. For a cut through the right side only, the Y value need to be calculated for the starting and the end point, namely the tip of the clavicle (CY) and the bottom point of the right scapula (SCB_RY). This calculation is performed using the formulas obtained on the REGRESSION ANALYSIS previously done.

$CY$=1.20−0.280 $WBX$=1.20−(0.280)(126.6905)=−34.27334

$SCB\_RY$=11.7+(0.407)(126.6905)=63.2635

Next, the SPLINES are used to calculate the 3D trajectory using the following formulas:

SPLINE_TRAJECTORY_YXR:
$$X = 0.0000744Y^3 - 0.00393Y^2 + 0.0939Y + 79$$
SPLINE_TRAJECTORY_YZ: $Z = -0.000137Y^3 +$
$$0.0134Y^2 + 0.218Y - 4.83$$

Since the Y values for the tip of the clavicle (CY) and the right-bottom scapula (SCB_RY) are known, the remaining values, X and Z, can be calculated.

$CX$=0.0000744(−34.27334)$^3$−0.00393(−34.27334)+0.0939(−34.27334)+79 $CX$=68.17

$CZ$=−0.000137(−34.27334)$^3$+0.0134(−34.27334)$^2$+0.218(−34.27334)−4.83 $CZ$=8.95

$SCB\_RX$=0.0000744(63.2635)$^3$−0.00393(63.2635)$^2$+0.0939(63.2635)+79 $SCB\_RX$=88.05

$SCB\_RZ$=−0.000137(63.2635)$^3$+0.0134(63.2635)$^2$+0.218(63.2635)−4.83 $SCB\_RZ$=27.90

Now, the 3D error can be calculated (Euclidean distance between the calculated and the real values) of the starting and the end points whose real values are the following:

TABLE 5

|  | X | Y | Z |
|---|---|---|---|
| TIP OF THE CLAVICLE | 62.433 | −42.271 | 16.200 |
| BOTTOM OF THE RIGHT SCAPULA | 87.239 | 62.894 | 28.326 |

$$ErrorClavicle = \sqrt{(C\hat{X} - CX)^2 + (C\hat{Y} - CY)^2 + (C\hat{Z} - CZ)^2}$$
$$= \sqrt{(68.17 - 62.43)^2 + (-34.27 - (-42.27))^2 + (8.95 - 16.2)^2}$$

Error Clavicle=12.22 MM

Figure 14:
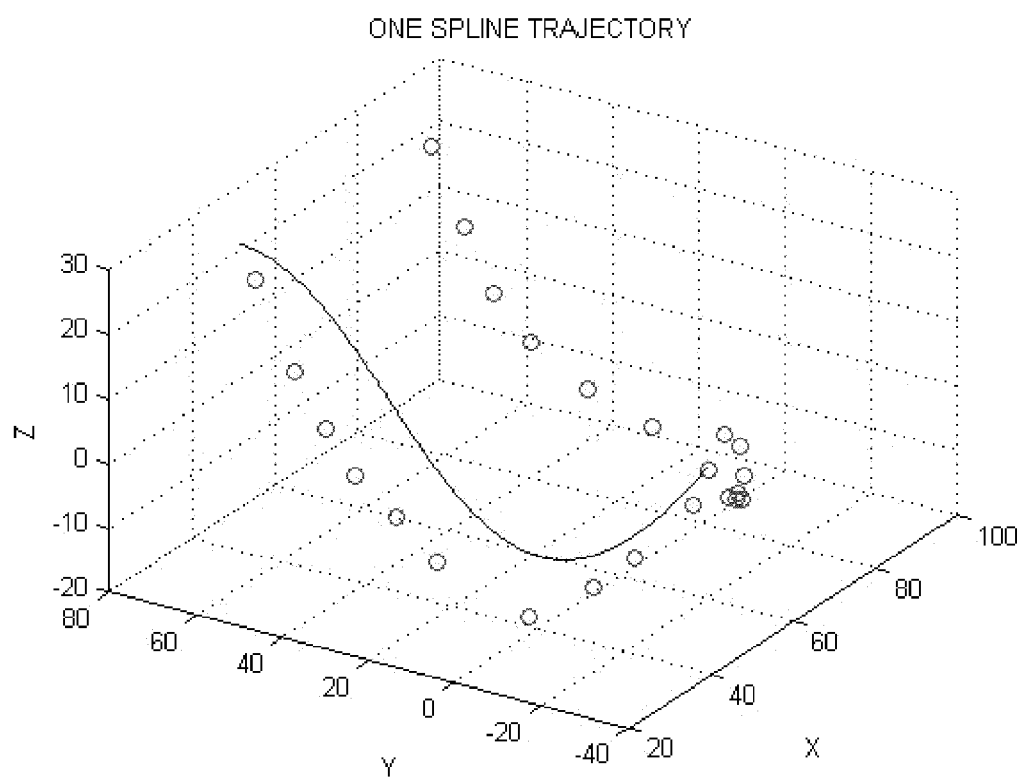
FIG. 14 graphically depicts a one spline trajectory.

The error for the bottom of the right scapula can be calculated the same way resulting in the following answer:
Error Scapula=0.985 mm
The one spline trajectory is shown in FIG. 14.

CASE II—USING TWO SPLIT SPLINES, ONE FOR CLAVICLE AND ONE FOR EACH SCAPULA. In this case, X was used as the independent variable for the right and left clavicle trajectories, and Y was used as the independent variable for the right and left scapula trajectories. In CASE I, three points were calculated to define the left and right trajectories, namely CY, SCB_RY, and SCB_LY. For CASE II, the following seven points need to be calculated to accomplish the same purpose:

1. X value of tip of the clavicle (CX).
2. X value of the right top point of the clavicle (RX).
3. X value of the left top point of the clavicle (LX).
4. Y point of the right top point of the scapula (SCT_RY).
5. Y point of the left top point of the scapula (SCT_LY).
6. Y point of the right bottom point of the scapula (SCB_RY).
7. Y point of the left bottom point of the scapula (SCB_LY).

Using the formulas obtained on the REGRESSION ANALYSIS previously done, we calculate those seven points.

1. CX=−0.955+0.5166 WBX=−0.955+(0.5166)(126.6905)=64.49
2. RX=3.45+0.681 WBX=89.73
3. LX=6.31+0.247 WBX=37.60

4. SCT_RY=−6.66+0.142 WBX=11.33
5. SCT_LY=−6.55+0.141 WBX=11.31
6. SCB_RY=11.7+0.407 WBX=63.26
7. SCB_LY=12.4+0.410 WBX=64.34

Next the SPLINES were used to calculate the 3D trajectory using the following formulas:

SPLINE_CLAVICLE_XYR: $Y = 0.025X^2 - 2.72X + 35.2$

SPLINE_CLAVICLE_XYL: $Y = 0.0151X^2 - 2.46X + 46.9$

SPLINE_CLAVICLE_XZR: $Z = -0.0119X^2 + 0.507X + 30.4$

SPLINE_CLAVICLE_XZL: $Z = 0.000726X^2 + 1.14X - 44.5$

SPLINE_SCAPULA_YXL: $X = -0.000442Y^2 + 0.119Y + 33.9$

SPLINE_SCAPULA_YXR: $X = 0.0014Y^2 + 0.0484Y + 78.1$

SPLINE_SCAPULA_YZ: $Z = 0.0515Y^2 + 0.23Y - 2.26$

Since we have the X and Y values for the clavicle and scapula, respectively, these values were used to calculate the Y and Z values on the clavicle, and the X and Z values on the scapula. Some landmark points that were used to estimate the error are as follows:

CY=−36.24 (using right clavicle spline)
RY=−7.59
CZ=13.60 (using right clavicle spline)
RZ=−19.91
CY=−48.95 (using left clavicle spline)
LY −24.25
CZ=32.04 (using left clavicle spline)
LZ=−0.61
SCT_RX=78.83
SCB_RX=86.77
SCT_RZ=1.01
SCB_RZ=32.90
SCT_LX=35.19
SCB_LX=39.73
SCT_LZ=1.00
SCB_LZ=33.86

Now, the 3D error (Euclidean distance between the calculated and the real values) of the starting and the end points can be calculated whose real values are the following:

| Description (Nomenclature) | X | Y | Z |
|---|---|---|---|
| Tip of the clavicle (C) | 62.433 | −42.271 | 16.200 |
| Left top point of the clavicle (L) | 41.062 | −13.255 | −11.263 |
| Right top point of the clavicle (R) | 87.991 | −13.821 | −12.784 |
| Right top point of scapula (SCT__R) | 90.823 | 1.832 | −7.026 |
| Left top point of scapula (SCT__R) | 37.651 | 12.689 | −5.905 |
| Right bottom point of scapula (SCT__R) | 87.239 | 62.894 | 28.326 |
| Left bottom point of scapula (SCT__L) | 44.490 | 62.723 | 26.527 |

Figure 15:
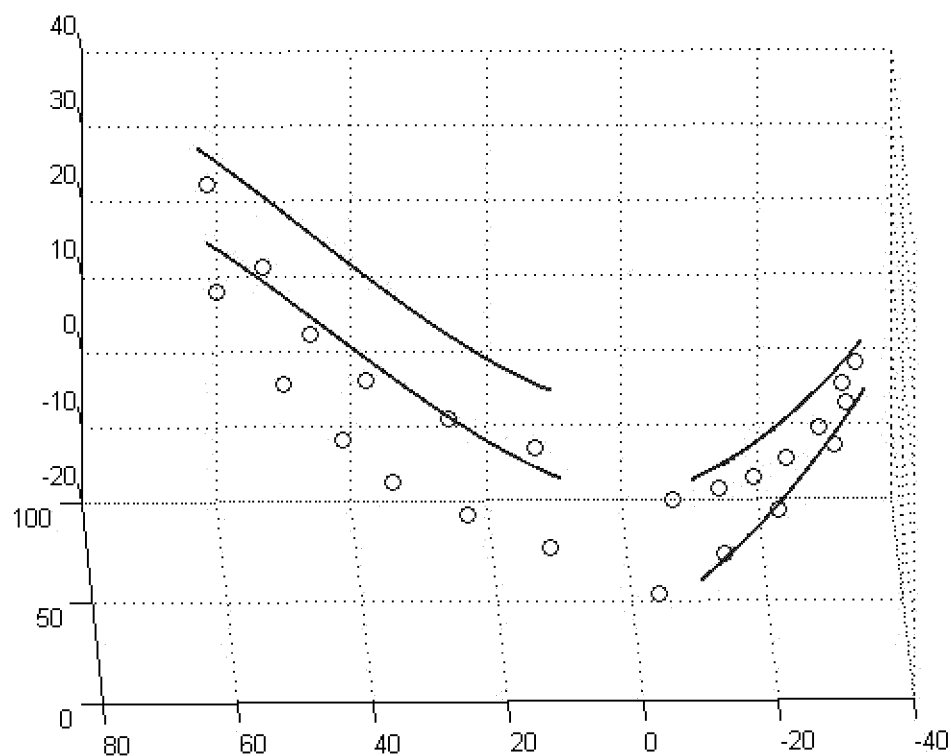
FIG. 15 graphically depicts a two split spline trajectory.

Error Clavicle Tip (using right trajectory)=6.88 mm
Error Clavicle Top Right=9.63 mm
Error Clavicle Tip (using left trajectory)=17.31 mm
Error Clavicle Top Left=17.11 mm An interesting observation is that better Y and Z values were obtained on the tip and the two top points when the results of the two clavicle trajectories were averaged. In this case, the Error Clavicle Tip is 7.0 mm while the Error Clavicle Top is less than 4.5 mm in both points left and right.
Error Scapula Top Right=17.28 mm
Error Scapula Bottom Right=4.62 mm
Error Scapula Top Left=7.46 mm
Error Scapula Bottom Left=8.89 mm FIG. 15 graphically depicts a two split spline trajectory.

CASE III—USING ONE NORMALIZED TRAJECTORY SPLINE. As in Case I, Y was used as the independent variable while X and Z are dependent. However, Y values have to be divided by WBX to obtain Y' as independent variable and X' and Z' as dependent. As in case I, for a cut through the right side, the Y' value need only be calculated for the starting and the end point, namely the tip of the clavicle (CY') and the bottom point of the right scapula (SCB_RY'), which is performed using the formulas obtained on the REGRESSION ANALYSIS previously done.

$CY'$=(1.20−0.280 $WBX$)/$WBX$=(1.20−(0.280)(126.6905))/126.6905=−0.2705

$SCB\_RY'$=(11.7+(0.407)(126.6905))/126.6905=0.4994

Next, the SPLINES are used to calculate the 3D trajectory using the following formulas:

SPLINE_TRAJECTORY_YXRN:

$$X' = 0.863Y^3 - 0.546Y^2 + 0.104Y + 0.0697$$

SPLINE_TRAJECTORY_YZ: $Z' = -2.09Y^3 + 1.64Y^2 + 0.245Y - 0.047$

Figure 16:
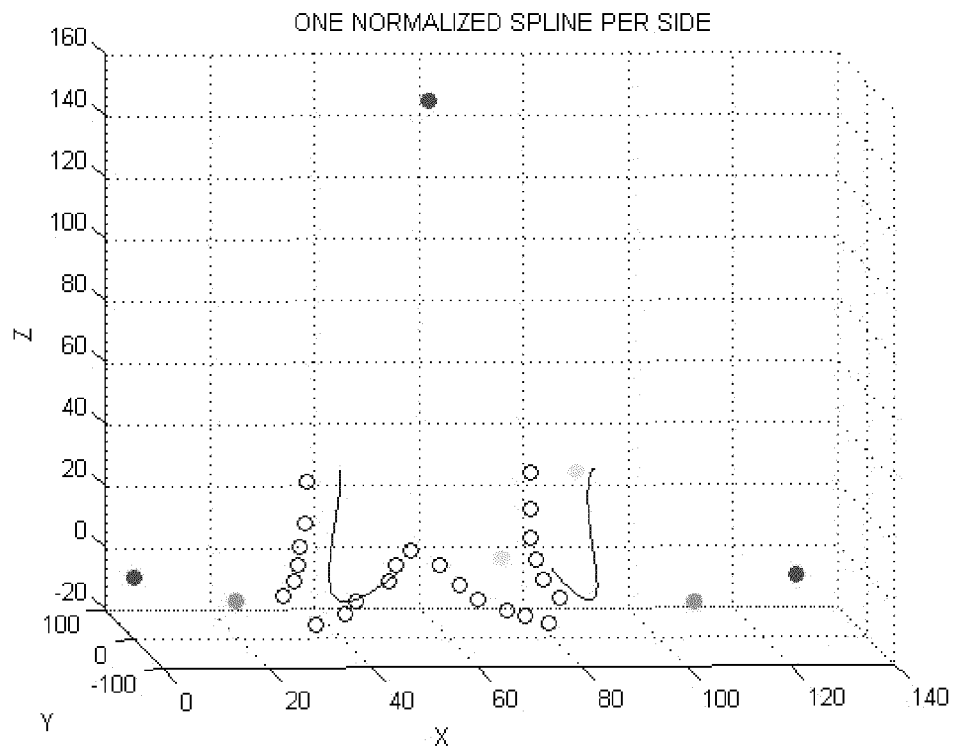
FIG. 16 graphically depicts one normalized trajectory.

FIG. 16 graphically depicts one normalized trajectory.

Reference
1. Smith, D. P., *Defects of Pre-and Post-Deboned Broiler Breasts*. Journal of Applied Poultry Research, 2001. 10: p. 33-40.

What is claimed is:

1. A device for supporting a carcass comprising:
   a base;
   a frame attached to the base, wherein the frame is configured to contact at least a portion of a cavity of a carcass;
   an electromagnetic radiation source, wherein the electromagnetic radiation source is configured to irradiate at least a portion of a cavity of a carcass; and
   wherein the base defines a hole and the electromagnetic radiation source is configured to project electromagnetic radiation through the hole so as to irradiate at least a portion of the cavity of the carcass.

2. The device for supporting a carcass of claim 1, wherein the frame comprises one or more projections projecting from the base, wherein one or more projections are configured to contact at least a portion of a cavity of a carcass.

3. The device for supporting a carcass of claim 1, wherein the frame comprises a substantially continuous support surface, wherein the support surface is configured to contact at least a portion of a cavity of a carcass.

4. The device for supporting a carcass of claim 1, wherein the electromagnetic radiation source is attached to the base.

5. The device for supporting a carcass of claim 4, wherein the electromagnetic radiation source comprises one or more light emitting diodes.

6. The device for supporting a carcass of claim 1, wherein the electromagnetic radiation source comprises one or more light emitting diodes.

7. A system for detecting an anatomical structure in a carcass comprising:
   a device for supporting a carcass comprising a base and a frame, the frame attached to the base, wherein the frame is configured to contact at least a portion of a cavity of a carcass;

a signal source, wherein the signal source is configured to interrogate at least a portion of a cavity of a carcass;

wherein the base defines a hole and the signal source is configured to project a signal through the hole so as to interrogate at least a portion of the cavity of the carcass;

one or more detectors, wherein the detector is capable of detecting at least a portion of the signal transmitted through the carcass; and an image processing subsystem in communication with the one or more detectors, wherein the image processing subsystem processes data collected by the detector to produce an image of at least one bone attached to the carcass.

8. The system of claim 7, wherein the frame comprises one or more projections projecting from the base, wherein one or more projections are configured to contact at least a portion of a cavity of a carcass.

9. The system of claim 7, wherein the frame comprises a substantially continuous support surface, wherein the support surface is configured to contact at least a portion of a cavity of a carcass.

10. The system of claim 7, wherein the signal source is attached to the base.

11. The system of claim 10, wherein the signal source is an electromagnetic radiation source, wherein the electromagnetic radiation source is configured to irradiate at least a portion of a cavity of a carcass.

12. The system of claim 7, wherein the signal source is an electromagnetic radiation source.

13. The system of claim 7, wherein the one or more detectors comprises a first camera, a second camera, and a third camera, wherein the first camera provides a center view of the carcass, the second camera provided a right view of the carcass, and the third camera provides a left view of the carcass.

14. The system of claim 7, further comprising a user interface, wherein the user interface provides real time feedback to a user regarding at least one bone attached to the carcass.

15. The system of claim 14, wherein the anatomical structure comprises at least one bone selected from the group consisting of a clavicle, a fan bone, and a coracoid.

16. The system of claim 14, wherein the anatomical structure comprises at least one muscle.

17. A method for detecting an anatomical structure in a carcass comprising:

supporting the carcass on a device, the device comprising a base and frame, the frame attached to the base, wherein the frame is configured to contact at least a portion of a cavity of a carcass;

providing a signal from a signal source, wherein the signal source is configured to interrogate at least a portion of the cavity of the carcass;

wherein the base defines a hole and the signal source is configured to project a signal through the hole so as to interrogate at least a portion of the cavity of the carcass;

detecting a presence or an absence of an anatomical structure in a carcass, wherein the detecting is conducted with one or more detectors capable of detecting at least a portion of the signal interrogating the at least a portion of the cavity of the carcass; and providing information to a user regarding a process in real time, wherein the information can be used by the user to modify the process.

18. The method for detecting an anatomical structure in a carcass of claim 17, wherein the anatomical structure is bone and the process is a deboning process.

19. The method for detecting an anatomical structure in a carcass of claim 18, the providing the signal from a signal source comprises irradiating at least a portion of a cavity of a carcass with a first power level of electromagnetic radiation;

the detecting comprises a first detector that detects at least a portion of the first power level of electromagnetic radiation transmitted through the carcass; and the providing information to a user comprises producing an image of at least one bone on the carcass, wherein data for the image is collected from the detector.

20. The method for detecting an anatomical structure in a carcass of claim 19, further comprising:

irradiating at least a portion of a cavity of a carcass with a second power level of electromagnetic radiation;

detecting with a second detector at least a portion of the second power level of electromagnetic radiation transmitted through the carcass; and producing an image of at least one bone on the carcass, wherein data for the image is collected from the detector.

21. The method for detecting an anatomical structure in a carcass of claim 19, wherein the at least one bone is selected from the group consisting of a clavicle, a fan bone, and a coracoid.

22. The method for detecting an anatomical structure in a carcass of claim 17, wherein the anatomical structure is muscle and the process is a deboning process.

* * * * *